United States Patent
Lee et al.

(10) Patent No.: US 11,917,631 B2
(45) Date of Patent: Feb. 27, 2024

(54) METHOD FOR TRANSMITTING AND RECEIVING DOWNLINK SIGNAL BETWEEN TERMINAL AND BASE STATION IN WIRELESS COMMUNICATION SYSTEM AND APPARATUS FOR SUPPORTING SAME

(71) Applicant: LG ELECTRONICS INC., Seoul (KR)

(72) Inventors: Kilbom Lee, Seoul (KR); Hyungtae Kim, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 465 days.

(21) Appl. No.: 17/272,503

(22) PCT Filed: May 21, 2019

(86) PCT No.: PCT/KR2019/006047
§ 371 (c)(1),
(2) Date: Mar. 1, 2021

(87) PCT Pub. No.: WO2020/067623
PCT Pub. Date: Apr. 2, 2020

(65) Prior Publication Data
US 2021/0321447 A1    Oct. 14, 2021

(30) Foreign Application Priority Data

Sep. 28, 2018  (KR) ........................ 10-2018-0116502

(51) Int. Cl.
*H04W 4/00*     (2018.01)
*H04L 1/00*     (2006.01)
(Continued)

(52) U.S. Cl.
CPC ........... *H04W 72/23* (2023.01); *H04L 1/0013* (2013.01); *H04L 5/0048* (2013.01); *H04W 72/044* (2013.01); *H04W 72/1273* (2013.01)

(58) Field of Classification Search
CPC .............. H04W 72/23; H04W 72/044; H04W 72/1273; H04W 72/0446; H04W 88/08;
(Continued)

(56) References Cited

U.S. PATENT DOCUMENTS

| 11,716,740 B2 * | 8/2023 | Papasakellariou ...... H04L 5/005 370/329 |
| 2013/0242770 A1 * | 9/2013 | Chen ..................... H04L 1/1825 370/252 |

(Continued)

FOREIGN PATENT DOCUMENTS

| WO | 2018125910 | 7/2018 |
| WO | 2018143537 | 8/2018 |

OTHER PUBLICATIONS

PCT International Application No. PCT/KR2019/006047, International Search Report dated Sep. 11, 2019, 15 pages.
(Continued)

*Primary Examiner* — Phuongchau Ba Nguyen
(74) *Attorney, Agent, or Firm* — LEE, HONG, DEGERMAN, KANG & WAIMEY

(57) ABSTRACT

The present disclosure provides a method for transmitting and receiving a downlink signal between a terminal and a base station in a wireless communication system and an apparatus for supporting same. According to an embodiment applicable to the present disclosure, when the terminal recognizes that a first physical downlink shared channel (PDSCH) and a second PDSCH are overlapped, the terminal may receive a downlink signal including the first PDSCH, under the assumption that a phase tracking reference signal
(Continued)

(PT-RS) for the second PDSCH and the first PDSCH are overlapped.

13 Claims, 18 Drawing Sheets

(51) Int. Cl.
*H04L 5/00* (2006.01)
*H04W 72/044* (2023.01)
*H04W 72/1273* (2023.01)
*H04W 72/23* (2023.01)

(58) Field of Classification Search
CPC .......... H04W 72/0453; H04W 24/00; H04L 1/0013; H04L 5/0048; H04L 5/0053; H04L 1/00; H04L 5/0007
See application file for complete search history.

(56) References Cited

U.S. PATENT DOCUMENTS

| | | | |
|---|---|---|---|
| 2020/0221487 A1* | 7/2020 | Lee | H04L 5/0044 |
| 2020/0288441 A1* | 9/2020 | Park | H04W 72/0446 |
| 2021/0314045 A1* | 10/2021 | Cha | H04W 16/28 |
| 2021/0345323 A1* | 11/2021 | Axmon | H04W 72/12 |
| 2022/0046722 A1* | 2/2022 | Kim | H04L 5/0048 |
| 2023/0028824 A1* | 1/2023 | Zhang | H04L 5/0051 |

OTHER PUBLICATIONS

Qualcomm Incorporated, "Maintenance on Reference Signals and QCL," R1-1809504, 3GPP TSG RAN WG1 Meeting #94, Aug. 2018, 27 pages.

Qualcomm Incorporated, "Discussion on Simultaneous PDSCH Reception," R1-1803526, 3GPP TSG-RAN WG1 Meeting #92, Mar. 2018, 13 pages.

Samsung, "Issues on PTRS," R1-1801970, 3GPP TSG RAN WG1 Meeting #92, Mar. 2018, 8 pages.

* cited by examiner

[FIG. 1]
--Prior Art--
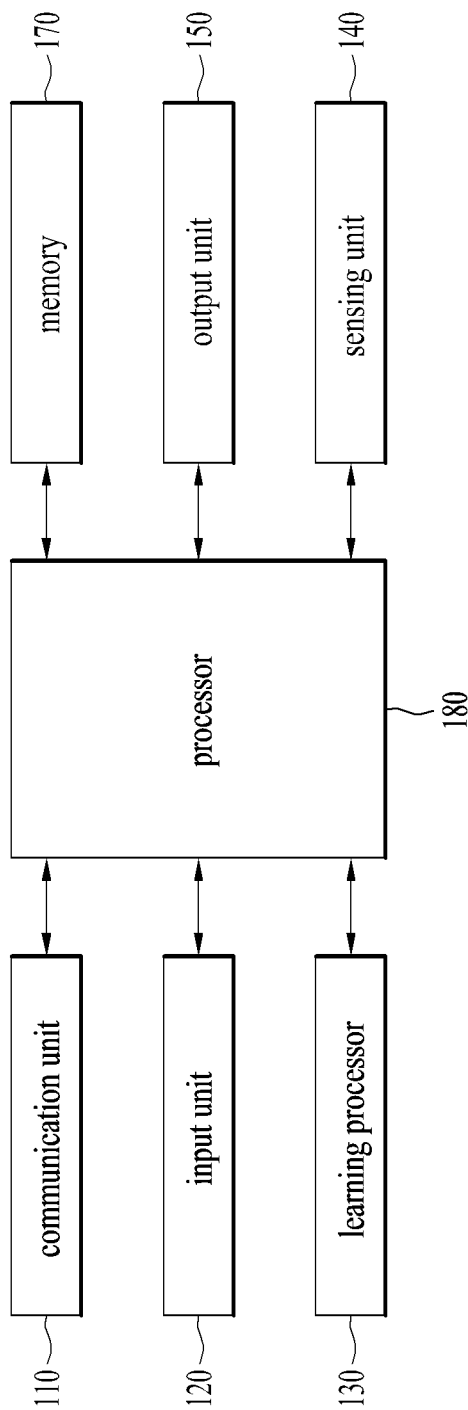

[FIG. 2]
--Prior Art--
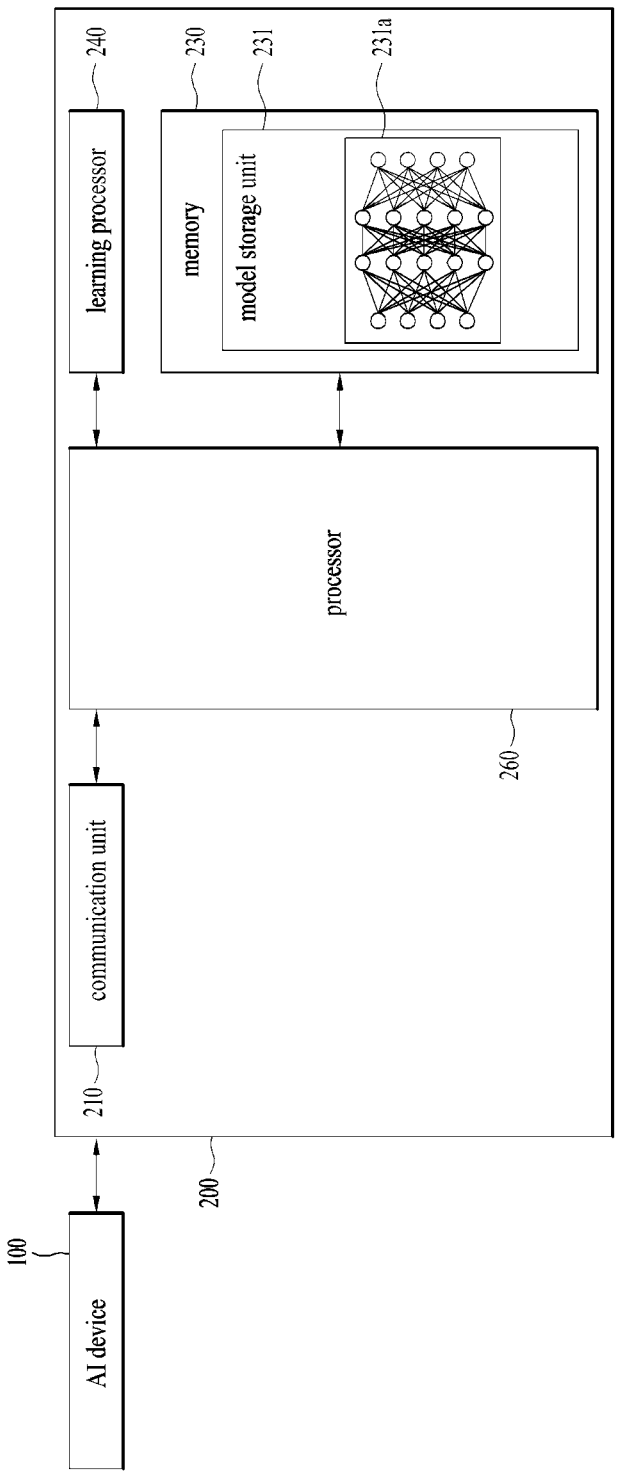

[FIG. 3]
--Prior Art--
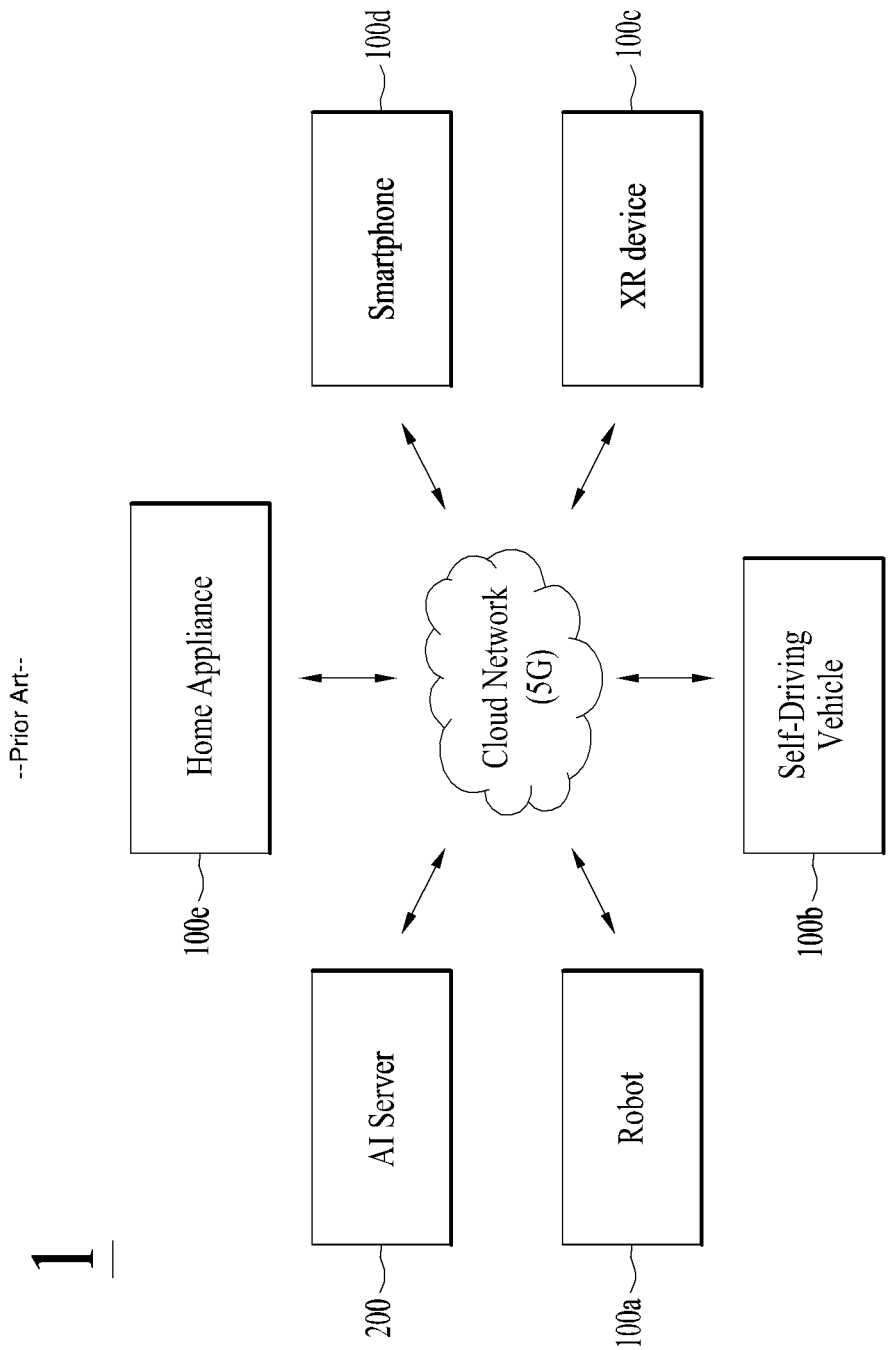

[FIG. 4]
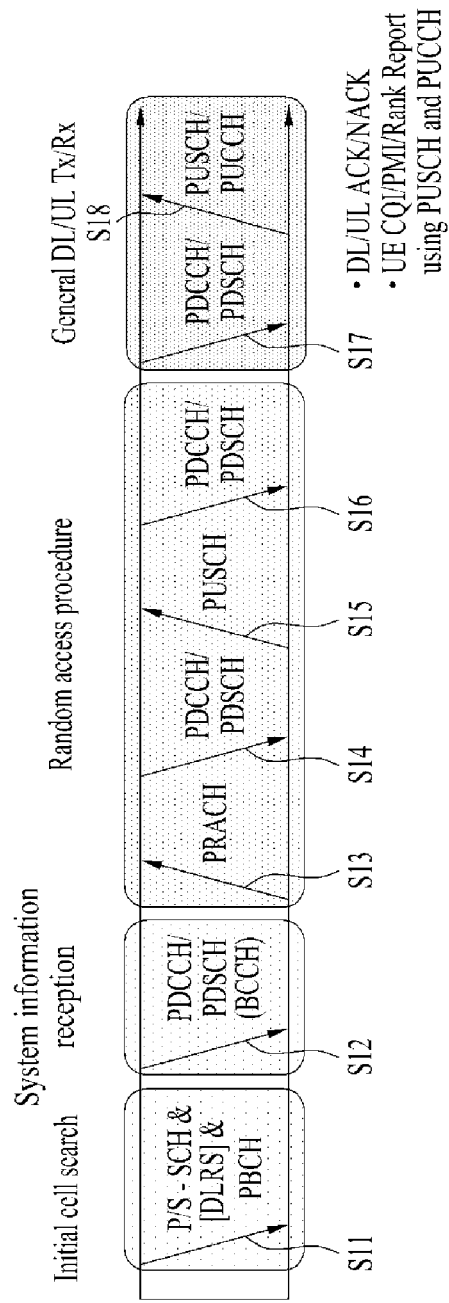

[FIG. 5]
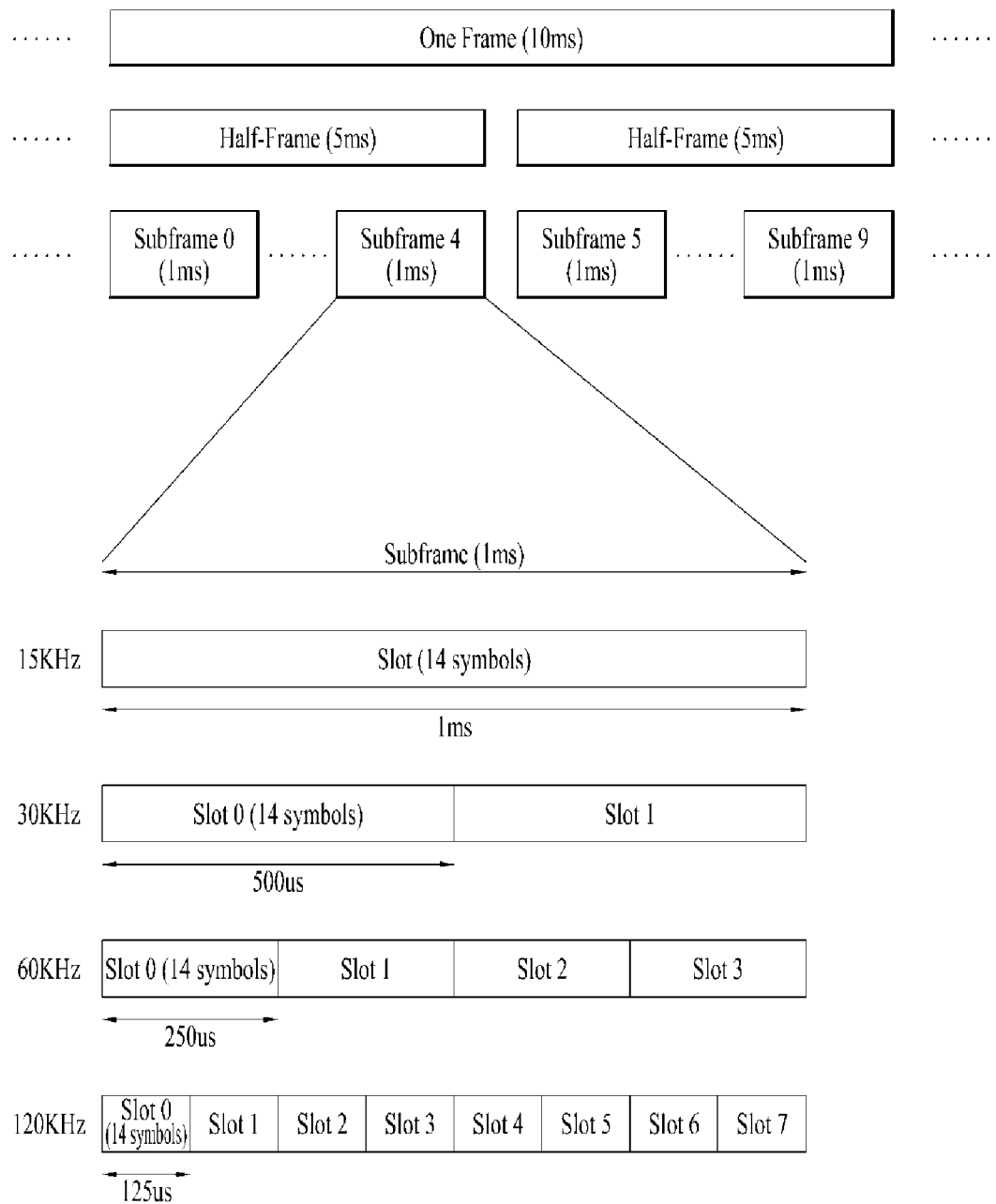

[FIG. 6]
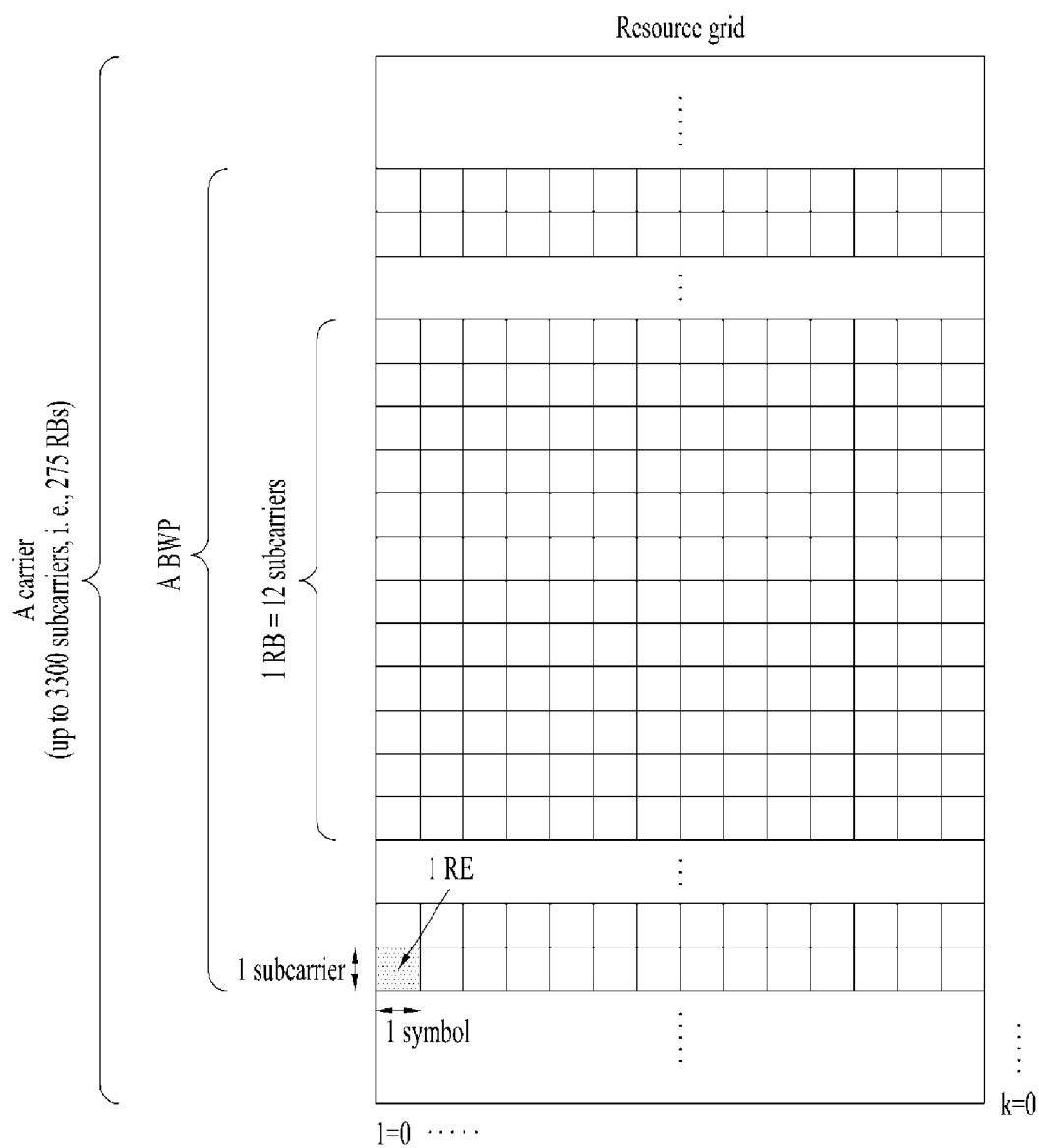

[FIG. 7]
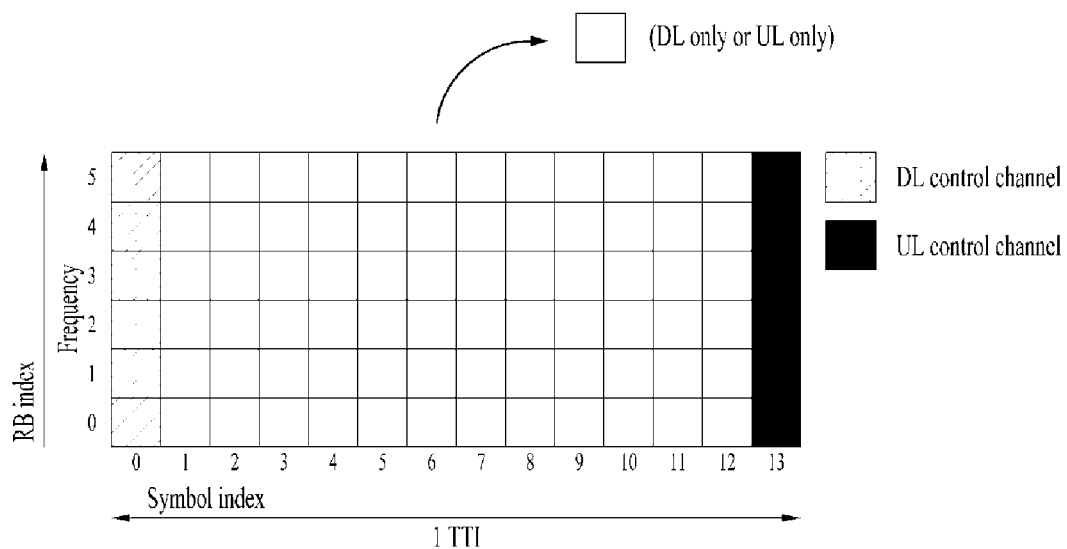
[FIG. 8]
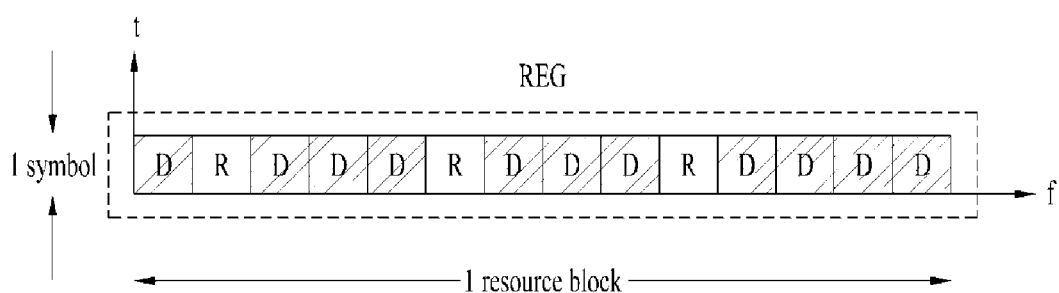

【FIG. 9】
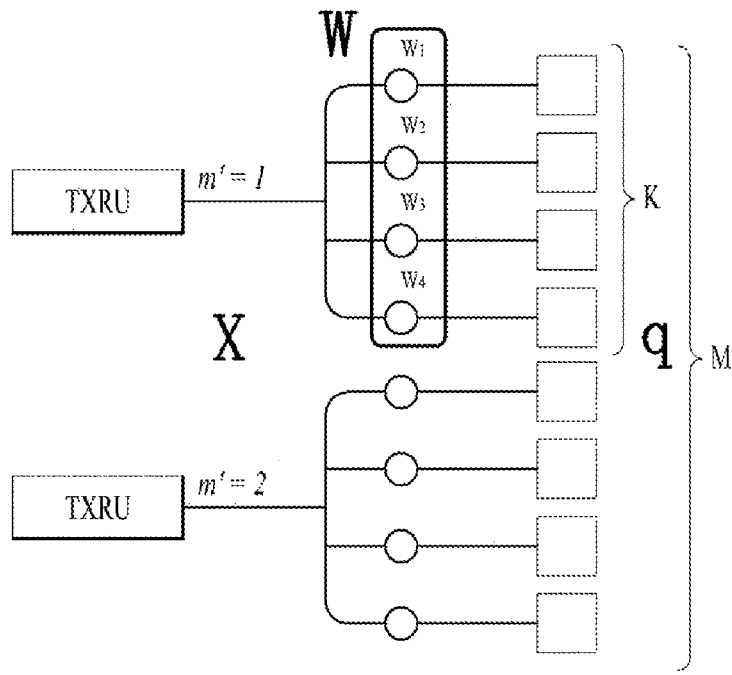
【FIG. 10】
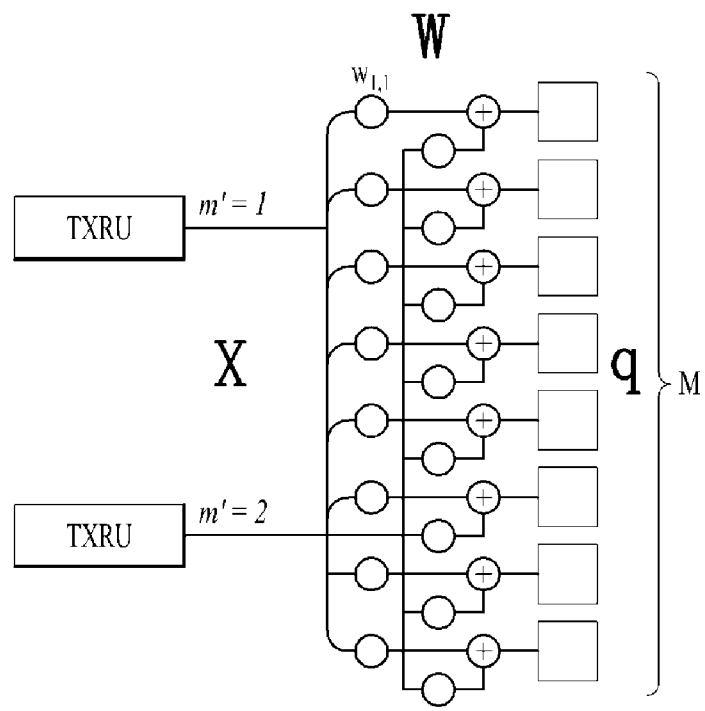

[FIG. 11]
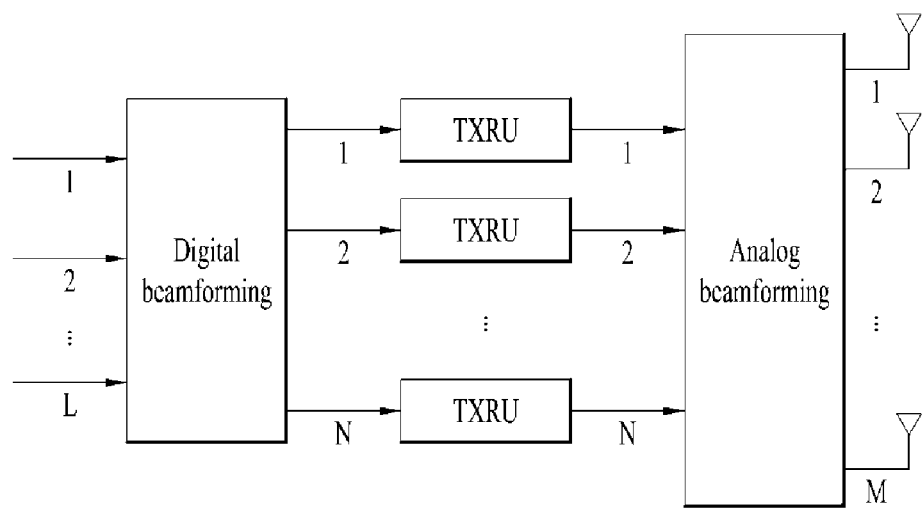

[FIG. 12]
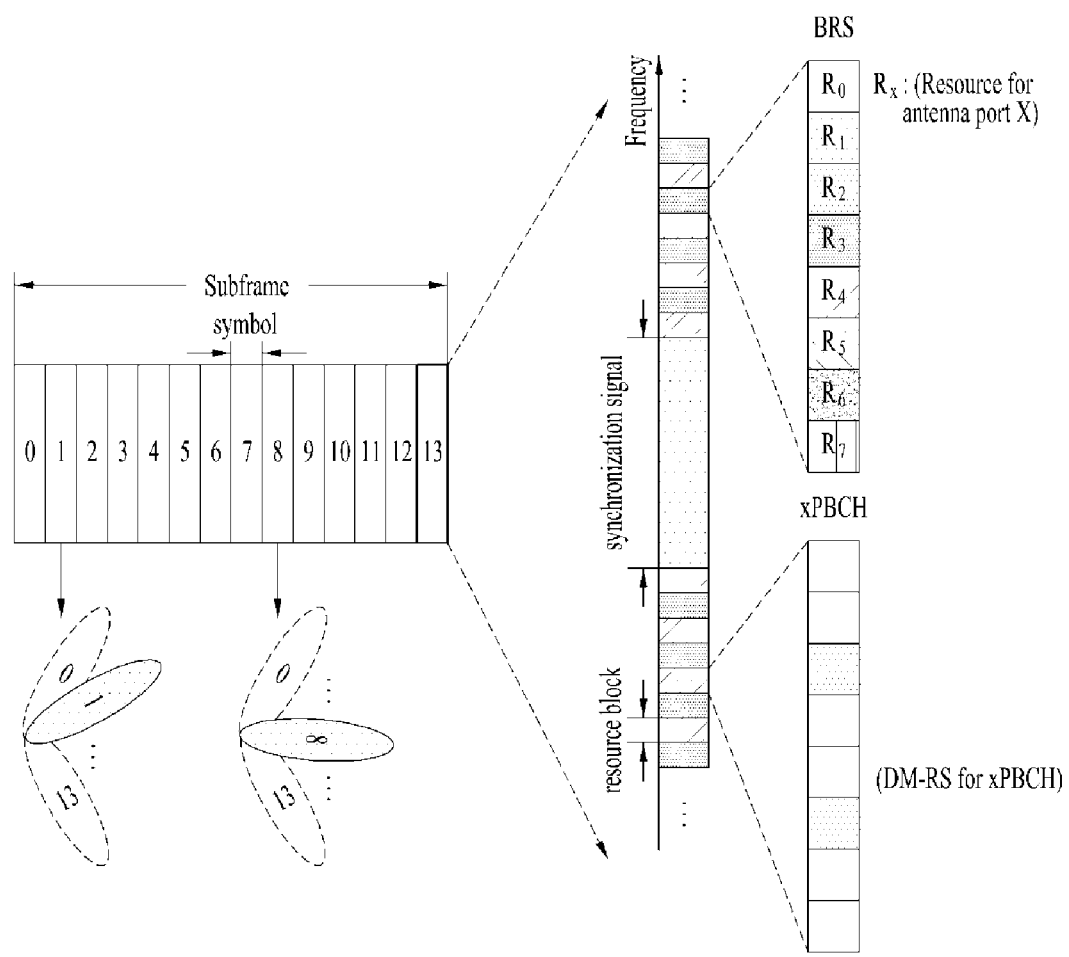

[FIG. 13]
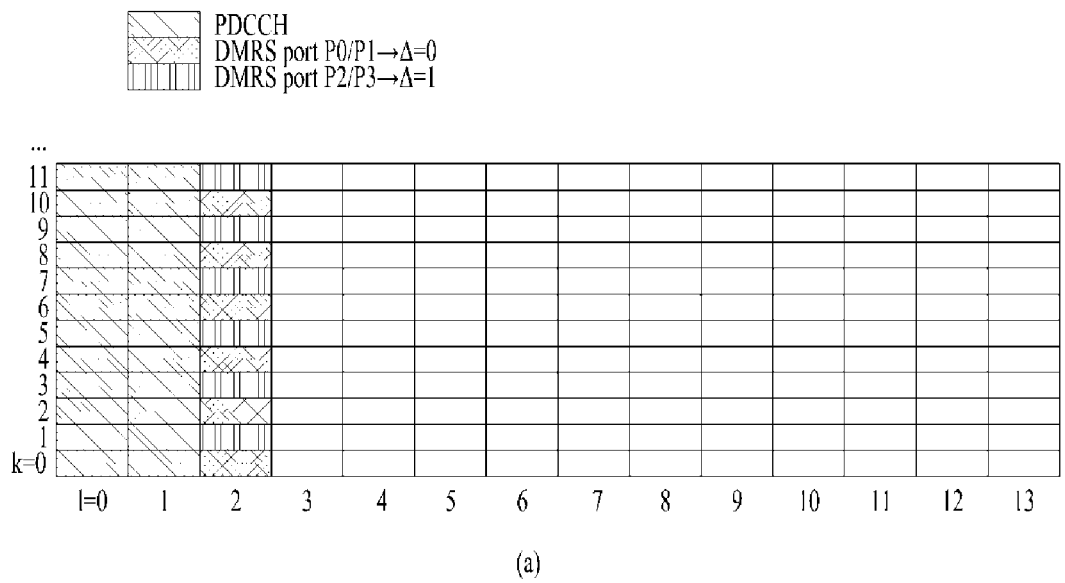
(a)
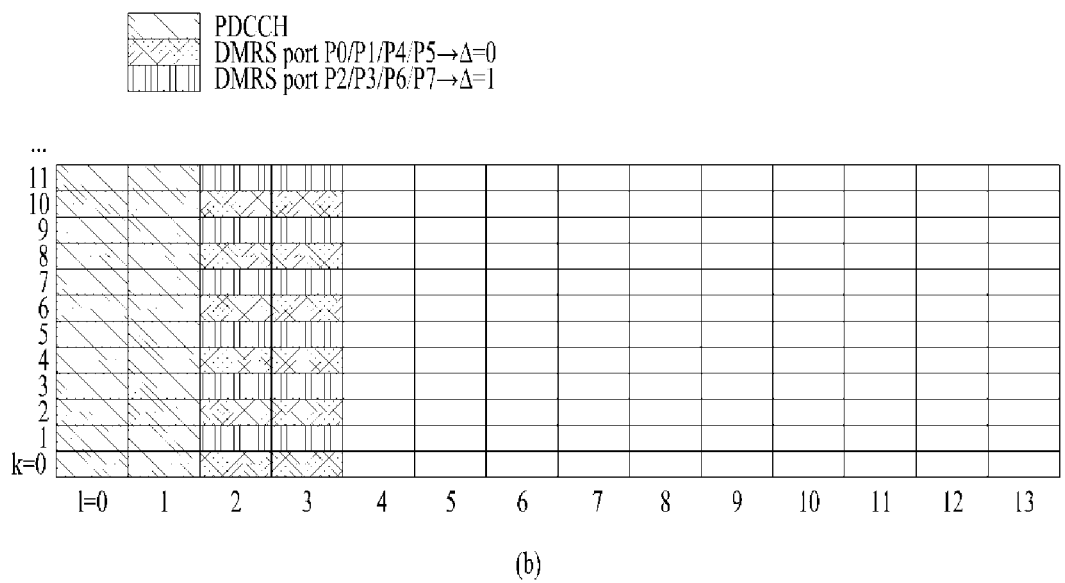
(b)

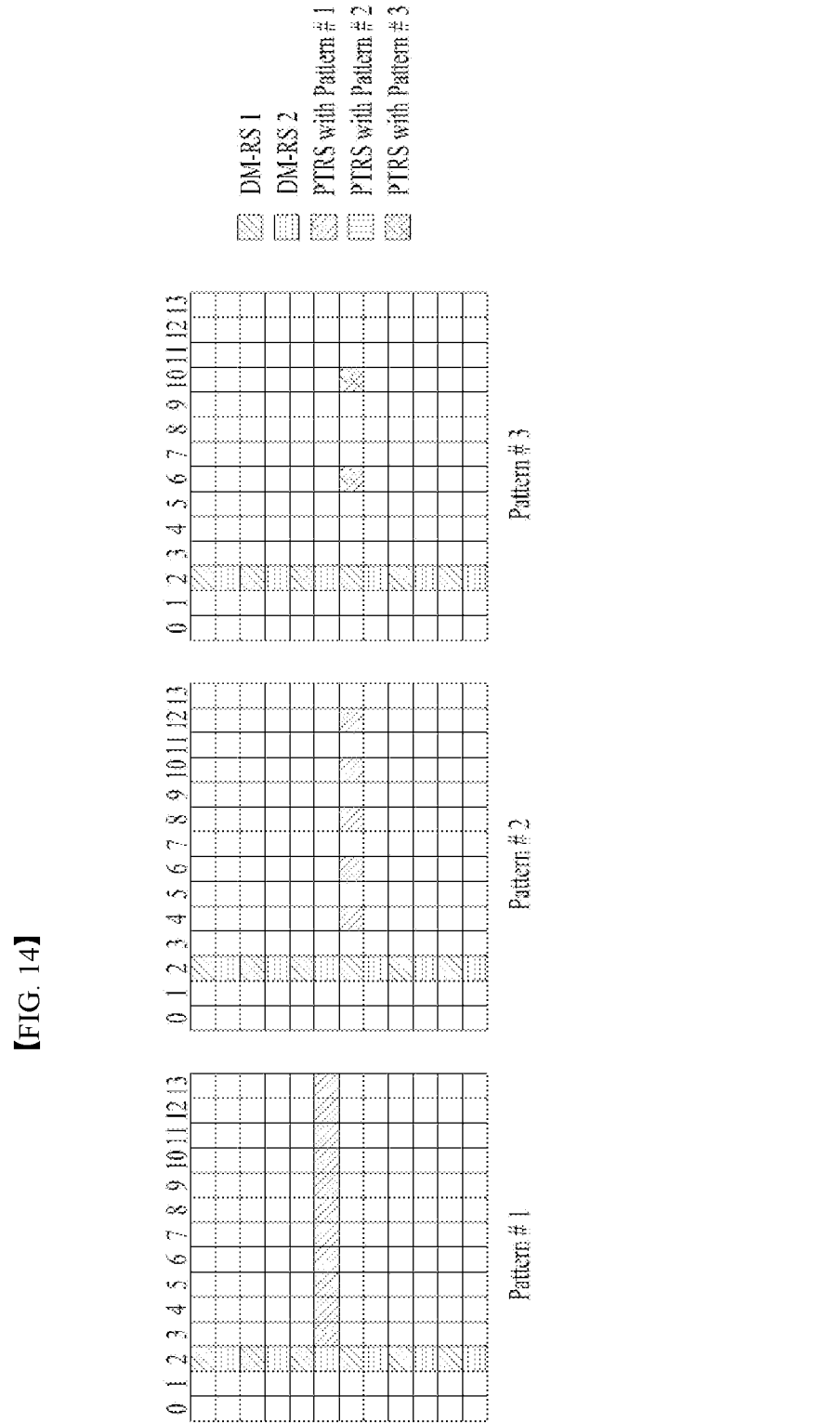
[FIG. 14]

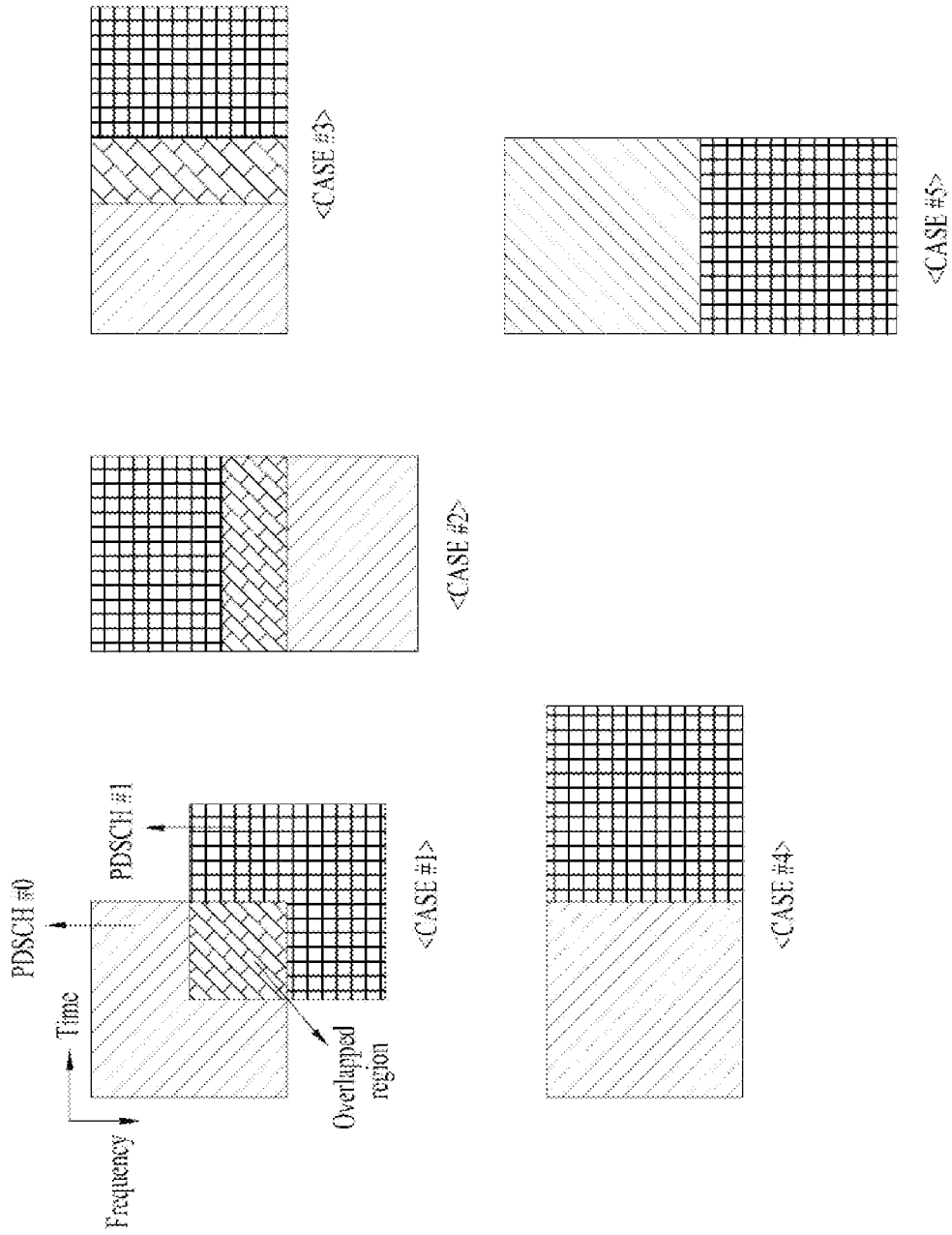
[FIG. 15]

[FIG. 16]
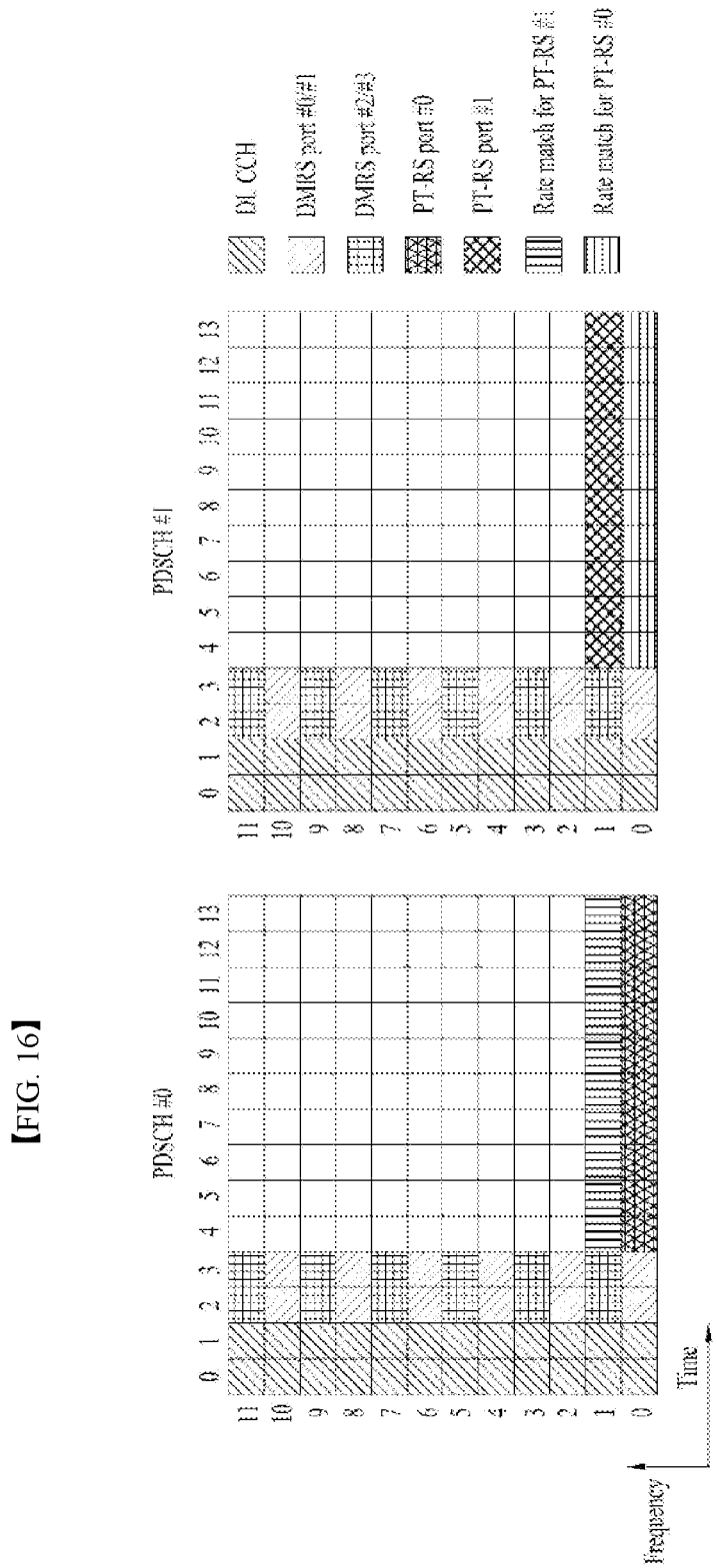

[FIG. 17]
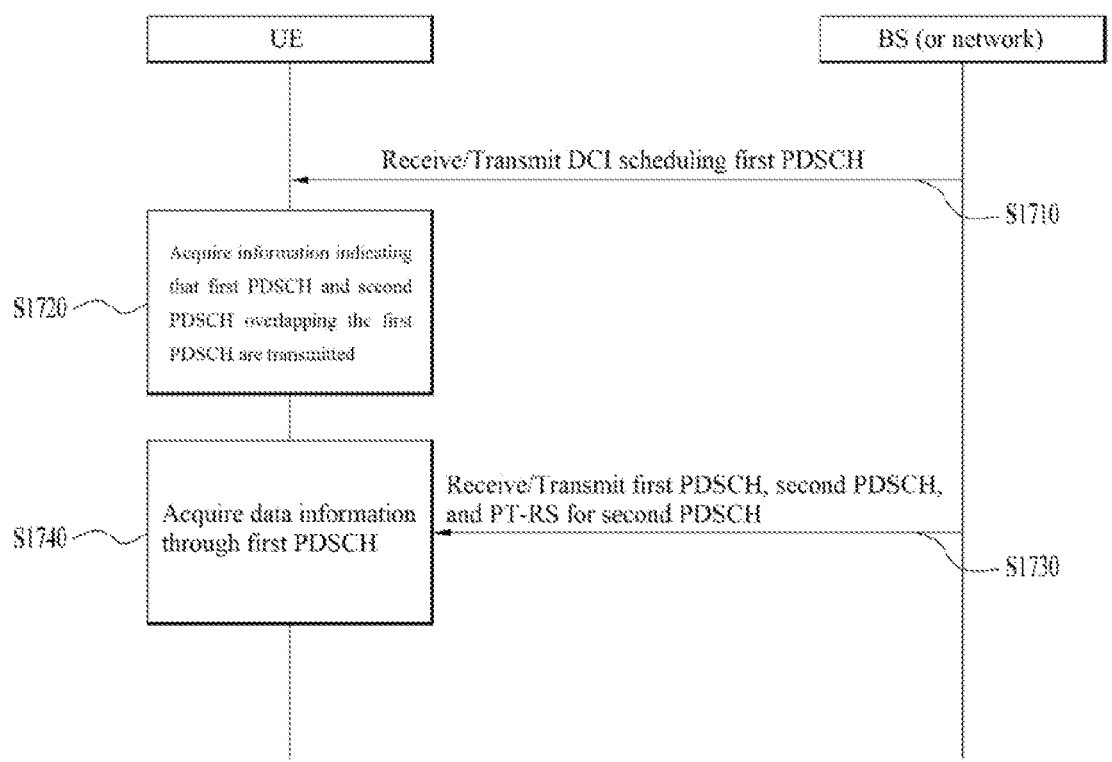

[FIG. 18]
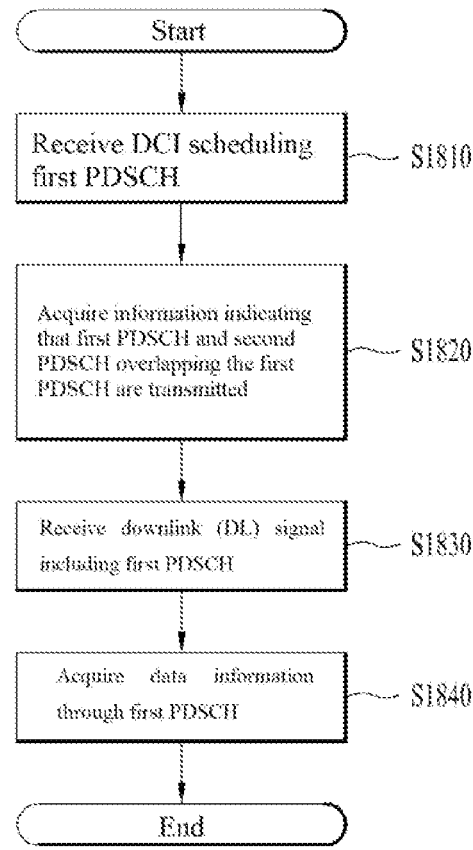
[FIG. 19]
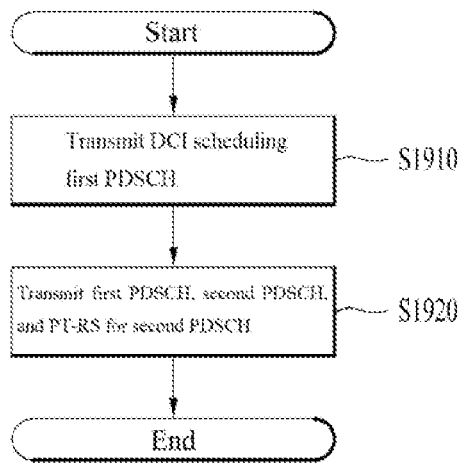

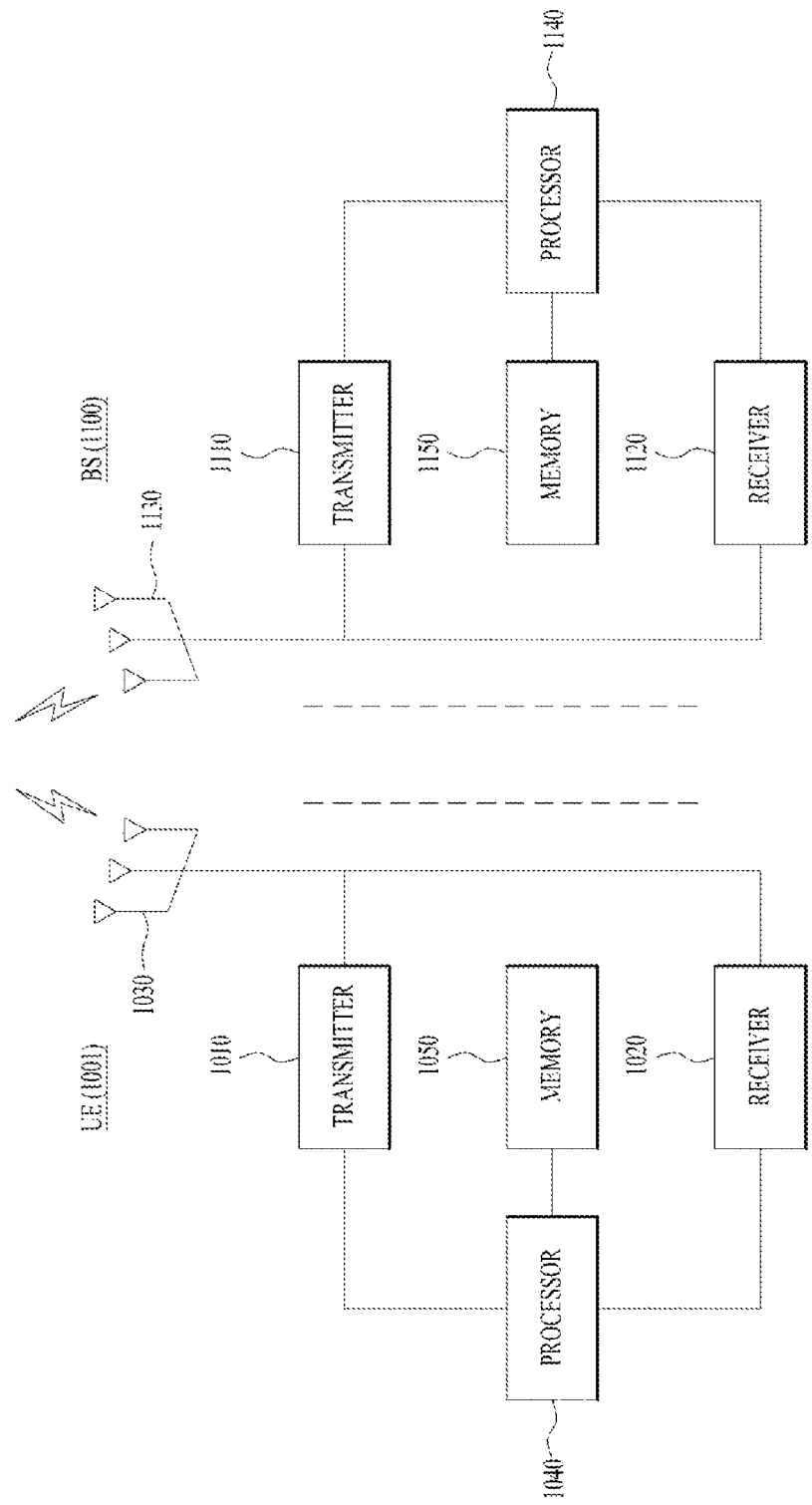
[FIG. 20]

[FIG. 21]
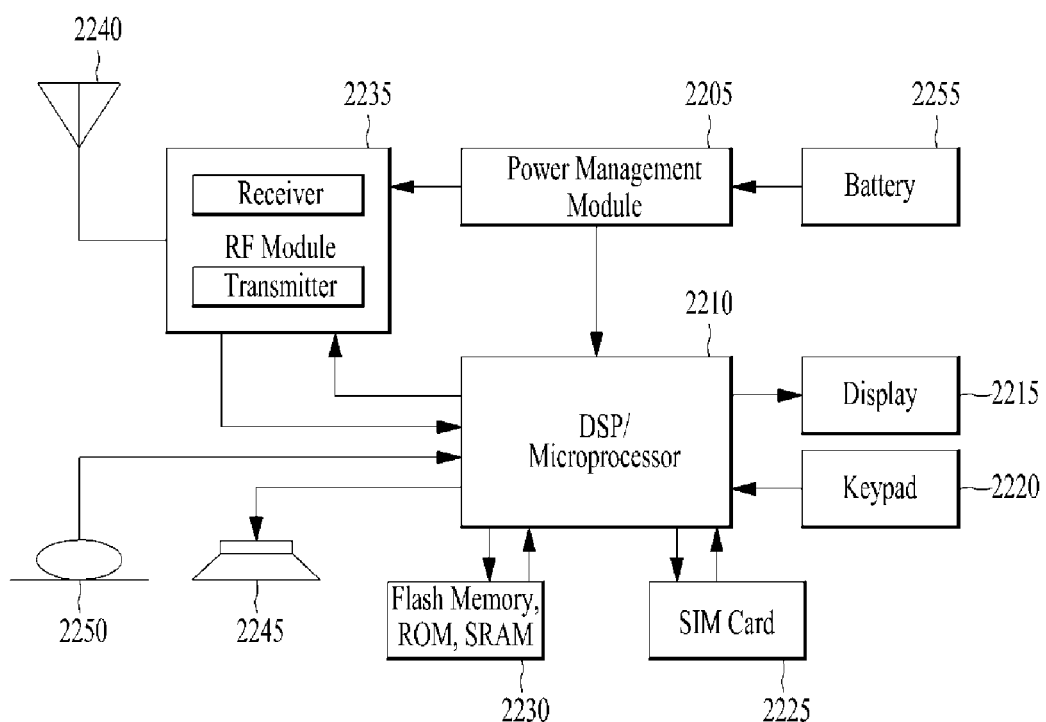

METHOD FOR TRANSMITTING AND RECEIVING DOWNLINK SIGNAL BETWEEN TERMINAL AND BASE STATION IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2019/006047, filed on May 21, 2019, which claims the benefit of earlier filing date and right of priority to KR Application No. 10-2018-0116502, filed on Sep. 28, 2018, the contents of which is incorporated by reference herein in its entirety.

TECHNICAL FIELD

The following description relates to a wireless communication system and, more particularly, to a method of transmitting and receiving a downlink (DL) signal between a user equipment (UE) and a base station (BS) in a wireless communication system, and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced.

Thus, eMBB communication, massive MTC, ultra-reliable and low-latency communication (URLLC), etc. have been introduced. In particular, various configurations for a phase tracking reference signal (PT-RS) to estimate phase noise between a user equipment (UE) and base station (BS) in various frequency bands are under discussion in consideration of a signal transmission and reception method in the various frequency bands.

The present disclosure may relate to the following technical configurations.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving or Autonomous Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting UE, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes global system for mobile communication (GSM), code division multi access (CDMA), long term evolution (LTE), $5^{th}$ generation (5G), wireless local area network (WLAN), wireless fidelity (Wi-Fi), Bluetooth™, radio frequency identification (RFID), infrared data association (IrDA), ZigBee, near field communication (NFC), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

DISCLOSURE

Technical Problem

An object of the present disclosure is to provide a method of transmitting and receiving a downlink (DL) signal between a user equipment (UE) and a base station (BS) in a wireless communication system, and an apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present disclosure provides a method of transmitting and receiving a downlink signal between a user equipment (UE) and a base station (BS) in a wireless communication system, and an apparatus for supporting the same.

In accordance with one aspect of the present disclosure, a method for receiving a downlink signal by a user equipment (UE) in a wireless communication system includes receiving downlink control information (DCI) scheduling a first physical downlink shared channel (PDSCH), acquiring specific information indicating that the first PDSCH and a second PDSCH overlapping the first PDSCH are transmitted to the user equipment (UE), and receiving the first PDSCH on the assumption that data is not transmitted through resources in which a resource allocated for the first PDSCH overlaps with a phase tracking reference signal (PT-RS) for the second PDSCH, based on the specific information.

The specific information indicating that the first PDSCH and the second PDSCH may be transmitted to the UE is obtained based on information indicating that the received DCI is associated with a plurality of transmission configuration indicator (TCI) states, wherein one TCI state from among the plurality of TCI states is associated with one reference signal (RS) set.

The specific information indicating that the first PDSCH and the second PDSCH may be transmitted to the UE is acquired based on a random network temporary identifier (RNTI) applied to the received DCI.

The first PDSCH and the second PDSCH may partially overlap each other in time and frequency domains.

The receiving the first PDSCH may include receiving the first PDSCH on the assumption that the first PDSCH is punctured or rate-matched in some resources in which a resource allocated for the first PDSCH overlaps with the phase tracking reference signal (PT-RS).

A time density of the phase tracking reference signal (PT-RS) may be assumed to be a default time density but not a modulation and coding scheme (MCS) scheduled for the user equipment (UE).

The default time density may be preset to 1 or 2.

A frequency density of the phase tracking reference signal (PT-RS) may be assumed to be a default frequency density but not a bandwidth (BW) size scheduled for the user equipment (UE).

The default frequency density may be preset to 2.

If a phase tracking reference signal (PT-RS) for the first PDSCH is associated with a demodulation reference signal (DMRS) port index X, it is assumed that the phase tracking reference signal (PT-RS) is associated with a DMRS port index Y matched to the DMRS port index X, wherein X or Y is a natural number.

If a DMRS configuration type 1 is configured for the first PDSCH, an {X, Y} combination may be set to any one of {#1000, #1002}, {#1001, #1003}, {#1002, #1000}, and {#1003, #1001}.

In accordance with another aspect of the present disclosure, a user equipment (UE) configured to receive a downlink signal in a wireless communication system includes at least radio frequency (RF) module, at least one processor, and at least one memory operatively connected to the at least one processor, and configured to store instructions such that the at least one processor performs specific operations by executing the instructions. The specific operations may include controlling the at least one RF module to receive downlink control information (DCI) scheduling a first physical downlink shared channel (PDSCH), acquiring specific information indicating that the first PDSCH and a second PDSCH overlapping the first PDSCH are transmitted to the user equipment (UE), and controlling the at least one RF module to receive the first PDSCH on the assumption that data is not transmitted through resources in which a resource allocated for the first PDSCH overlaps with a phase tracking reference signal (PT-RS) for the second PDSCH, based on the specific information.

The UE may communicate with at least one of a mobile terminal, a network, or a self-driving vehicle other than a vehicle including the UE.

In accordance with another aspect of the present disclosure, a base station (BS) configured to transmit a downlink signal in a wireless communication system includes at least radio frequency (RF) module, at least one processor, and at least one memory operatively connected to the at least one processor, and configured to store instructions such that the at least one processor performs specific operations by executing the instructions. The specific operations may include controlling the at least one RF module to transmit downlink control information (DCI) scheduling a first physical downlink shared channel (PDSCH) to a user equipment (UE), and transmitting the first PDSCH, a second PDSCH overlapping the first PDSCH, and a phase tracking reference signal (PT-RS) for the second PDSCH to the user equipment (UE), wherein data is not transmitted in resources in which the first PDSCH overlaps with the phase tracking reference signal (PT-RS).

The above-described aspects of the present disclosure are merely a part of the preferred embodiments of the present disclosure, and those skilled in the art will derive and understand various embodiments reflecting the technical features of the present disclosure based on the following detailed description of the present disclosure.

Advantageous Effects

As is apparent from the above description, the embodiments of the present disclosure have the following effects.

In a situation in which a plurality of PDSCHs scheduled by a plurality of DCIs exists, although the UE has missed one of the plurality of DCIs, the UE can acquire a data signal with higher reliability.

For example, although the UE has missed some DCIs, it is assumed that a phase tracking reference signal (PT-RS) associated with the missed DCI is transmitted according to predetermined rules, the UE may assume that data is not transmitted in some resources due to overlap between the PT-RS and the PDSCH, such that the UE can acquire data on this assumption. As a result, the phase tracking reference signal (PT-RS) can be protected and data communication can be performed in consideration of the PT-RS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 1 illustrates an artificial intelligence (AI) device according to an embodiment of the present disclosure.

FIG. 2 illustrates an AI server according to an embodiment of the present disclosure.

FIG. 3 illustrates an AI system according to an embodiment of the present disclosure.

FIG. 4 is a diagram illustrating physical channels and a general signal transmission method using the physical channels.

FIG. 5 is a diagram illustrating a radio frame structure in a new radio (NR) system to which embodiments of the present disclosure are applicable.

FIG. 6 is a diagram illustrating a slot structure in an NR system to which embodiments of the present disclosure are applicable.

FIG. 7 is a diagram illustrating a self-contained slot structure in an NR system to which embodiments of the present disclosure are applicable.

FIG. 8 is a diagram illustrating the structure of one resource element group (REG) in an NR system to which embodiments of the present disclosure are applicable.

FIGS. 9 and 10 are diagrams illustrating representative methods of connecting transceiver units (TXRUs) to antenna elements.

FIG. 11 is a diagram schematically illustrating an exemplary hybrid beamforming (BF) structure from the perspective of TXRUs and physical antennas according to the present disclosure.

FIG. 12 is a diagram schematically illustrating an exemplary beam sweeping operation for a synchronization signal and system information in a DL transmission procedure according to the present disclosure.

FIG. 13 is a diagram schematically illustrating an example of a front-loaded demodulation reference signal (DMRS) of a first DMRS configuration type applicable to the present disclosure.

FIG. 14 is a diagram illustrating time-domain phase tracking reference signal (PT-RS) patterns applicable to the present disclosure.

FIG. 15 is a diagram illustrating cases in which two physical downlink shared channels (PDSCHs) overlap on time and/or frequency resources, which are applicable to the present disclosure.

FIG. 16 is a conceptual diagram illustrating two PDSCHs applicable to the present disclosure, and DMRS and PT-RS for each PDSCH applicable to the present disclosure.

FIG. 17 is a diagram illustrating operations of a UE and a BS applicable to the present disclosure, FIG. 18 is a flowchart illustrating an operation of a UE according to the present disclosure, and FIG. 19 is a flowchart illustrating an operation of a BS according to the present disclosure.

FIG. 20 is a diagram illustrating configurations of a UE and a BS which may implement proposed embodiments.

FIG. 21 is a block diagram of a communication device which may implement proposed embodiments.

BEST MODE

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System

1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 4 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (HACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

FIG. 5 is a diagram illustrating a radio frame structure in an NR system to which embodiments of the present disclosure are applicable.

In the NR system, UL and DL transmissions are based on a frame as illustrated in FIG. 5. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

FIG. 6 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

FIG. 7 is a diagram illustrating a self-contained slot structures in an NR system to which embodiments of the present disclosure are applicable.

In FIG. 7, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 8.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 8 is a diagram illustrating the structure of one REG in an NR system to which embodiments of the present disclosure are applicable.

In FIG. 8, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |

TABLE 3-continued

| PUCCH format | Length in OFDM symbols $N_{symb}^{PUCCH}$ | Number of bits | Usage | Etc |
|---|---|---|---|---|
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

FIGS. 9 and 10 are diagrams illustrating representative methods for connecting TXRUs to antenna elements. Here, the TXRU virtualization model represents the relationship between TXRU output signals and antenna element output signals.

FIG. 9 shows a method for connecting TXRUs to sub-arrays. In FIG. 9, one antenna element is connected to one TXRU.

Meanwhile, FIG. 10 shows a method for connecting all TXRUs to all antenna elements. In FIG. 10, all antenna elements are connected to all TXRUs. In this case, separate addition units are required to connect all antenna elements to all TXRUs as shown in FIG. 10.

In FIGS. 9 and 10, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 9 has a disadvantage in that it is difficult to achieve beamforming focusing but has an advantage in that all antennas can be configured at low cost.

On the contrary, the configuration shown in FIG. 10 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

FIG. 11 is a diagram schematically illustrating an exemplary hybrid BF structure from the perspective of TXRUs and physical antennas according to the present disclosure. In FIG. 11, the number of digital beams is L and the number analog beams is N.

Additionally, in the NR system to which the present disclosure is applicable, a BS designs analog BF to be changed in units of symbols to provide more efficient BF support to a UE located in a specific area. Furthermore, as illustrated in FIG. 11, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

FIG. 12 is a diagram schematically illustrating an exemplary beam sweeping operation for a synchronization signal and system information in a DL transmission procedure according to the present disclosure.

In FIG. 12 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 12, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1=2) or fourth (e.g., 1=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

In the present disclosure, two DMRS configuration types may be applied. A DMRS configuration type which is substantially configured for the UE among the two DMRS configuration types may be indicated by higher layer signaling (e.g., RRC signaling).

DMRS configuration type 1 may be classified as follows according to the number of OFDM symbols to which the front-loaded DMRS is allocated.

DMRS Configuration Type 1 and Number of OFDM Symbols to which the Front-Loaded DMRS is Allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS Configuration Type 1 and Number of OFDM Symbols to which the Front-Loaded DMRS is Allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [1 1]. RS density may be set to 12 REs per port in the RB.

DMRS configuration type 2 may be classified as follows according to the number of OFDM symbols to which the front-loaded DMRS is allocated.

DMRS Configuration Type 2 and Number of OFDM Symbols to which the Front-Loaded DMRS is Allocated=1

Up to 6 ports (e.g., P0 to P5) may be multiplexed based on length-2 F-CDM and FDM schemes. RS density may be set to 4 REs per port in the RB.

DMRS Configuration Type 2 and Number of OFDM Symbols to which the Front-Loaded DMRS is Allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1 1]. RS density may be set to 8 REs per port in the RB.

FIG. 13 is a diagram schematically illustrating an example of a front-loaded DMRS of a first DMRS configuration type applicable to the present disclosure.

More specifically, FIG. 13(a) illustrates a front-loaded DMRS with one symbol and FIG. 13(b) illustrates a front-loaded DMRS with two symbols.

In FIG. 13, A represents a DMRS offset value on the frequency axis. In this case, DMRS ports having the same DMRS offset A may be subjected to code division multiplexing in the frequency domain (CDM-F) or code division multiplexing in the time domain (CDM-T). In addition, DMRS ports having different DMRS offsets A may be subjected to CDM-F.

The UE may obtain, through DCI, DMRS port configuration information set by the BS.

In this case, the UE may perform DMRS reception according to a condition as follows.

In DMRS configuration type 1,
one codeword may be scheduled for the UE and DCI indicating one of {2, 9, 10, 11, 30} may be allocated to the UE as an index value related to antenna port mapping.
If two codewords are scheduled for the UE,
the UE may receive a DMRS under the assumption that all other orthogonal antenna ports are not associated with PDSCH transmission to other UEs.

In DMRS setting type 2,
one codeword is scheduled for the UE and DCI indicating one of {2, 10, 23} may be allocated to the UE as an index value related to antenna port mapping.
If two codewords are scheduled for the UE,
the UE may receive a DMRS under the assumption that all other orthogonal antenna ports are not associated with PDSCH transmission to other UEs.

1.5. Phase Tracking Reference Signal (PT-RS)

Phase noise related to the present disclosure will be described. Jitter occurring on the time axis is observed as phase noise on the frequency axis. This phase noise randomly changes the phase of a received signal on the time axis as in the following equation.

$$r_n = s_n e^{j\phi_n} \text{ where} \quad \text{[Equation 1]}$$

-continued $$s_n = \sum_{k=0}^{N-1} d_k e^{j2\pi\frac{kn}{N}}$$

In Equation 1, parameters $r_n$, $s_n$, $d_k$, and $\phi_n$ represent phase rotation values caused by a received signal, a time-axis signal, a frequency-axis signal, and phase noise, respectively. When the received signal is subjected to DFT in Equation 1, Equation 2 is derived.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)m/N} \quad \text{[Equation 2]}$$

In Equation 2, parameters $$\frac{1}{N} \sum_{n=0}^{N-1} e^{j\phi_n} \text{ and } \frac{1}{N} \sum_{\substack{t=0 \\ t \neq k}}^{N-1} d_t \sum_{n=0}^{N-1} e^{j\phi_n} e^{j2\pi(t-k)m/N}$$

represent a common phase error (CPE) and inter-cell interference (ICI), respectively. As the correlation between phase noises increases, the CPE in Equation 2 has a larger value. Although the CPE is a kind of carrier frequency offset (CFO) in a wireless local area network (WLAN) system, the CPE and the CFO may be similarly interpreted in terms of phase noise from the viewpoint of a UE.

The UE removes the CPE/CFO which is phase noise on the frequency axis by estimating the CPE/CFO, and the process of estimating the CPE/CFO for the received signal should precede for accurate decoding of the received signal. Accordingly, the BS may transmit a predetermined signal to the UE so that the UE may accurately estimate the CPE/CFO. This signal used to estimate phase noise may be a pilot signal shared between the UE and the BS or a signal modified from a data signal or a duplicate signal of the data signal. Hereinafter, signals used for estimating phase noise are collectively called a PT-RS.

Basically, if a higher layer parameter phaseTrackingRS is established in a higher layer parameter DMRS-DownlinkConfig (or a higher layer parameter DMRS-UplinkConfig), the UE may assume the presence of a phase tracking reference signal (PT-RS), and may thus receive the phase tracking reference signal (PT-RS). However, (i) when the higher layer parameter phaseTrackingRS is not established, (ii) when the higher layer parameter phaseTrackingRS is established and a predetermined condition is satisfied (e.g., i) when the scheduled MCS (Modulation and Coding Scheme) is less than a predetermined value, ii) when the number of scheduled RBs is less than a predetermined number, iii) when the associated RNTI (Random Network Temporary Identifier) is set to an RA-RNTI (Random Access RNTI), an SI-RNTI (System Information RNTI), or a P-RNTI (Paging RNTI), the UE may assume that the PT-RS is not present.

In UL PT-RS, a detailed method for controlling the UE to transmit the UL PT-RS may be used differently depending on whether transform precoding is enabled or disabled. However, UL PT-RS can be commonly transmitted only within the resource block for PUSCH. Specifically, when transform precoding is disabled, UL PT-RS may be mapped to subcarriers for the DMRS port associated with the corresponding PT-RS port. The UL PT-RS may be mapped to some resource blocks from among resource blocks allocated for PUSCH transmission on the basis of a frequency density to be described later.

In DL PT-RS, the DL PT-RS can be transmitted only within the resource block for PDSCH, and may be mapped to subcarriers for the DMRS port associated with the corresponding PT-RS port. The DL PT-RS may be mapped to some resource blocks from among resource blocks allocated for PDSCH transmission on the basis of a frequency density to be described later.

1.5.1. Time-Domain Pattern (or Time Density)

FIG. 14 is a diagram illustrating time-domain PT-RS patterns applicable to the present disclosure.

As illustrated in FIG. 14, the PT-RS may have a different pattern according to a modulation and coding scheme (MCS) level applied to the PT-RS.

TABLE 8

| Scheduled MCS | Time density ($L_{PT-RS}$) |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Time density 1 may correspond to Pattern #1, time density 2 may correspond to Pattern #2, and time density 4 may correspond to Pattern #3 in FIG. 14.

The parameters, ptrs-MCS1, ptrs-MCS2, ptrs-MCS3, and ptrs-MCS4 in Table 4 may be defined by higher-layer signaling.

1.4.2. Frequency-Domain Pattern (or Frequency Density)

The PT-RS according to the present disclosure may be mapped to one subcarrier per RB, per two RBs, or per four RBs. The frequency-domain pattern (or frequency density) of the PT-RS may be configured according to the size of a scheduled bandwidth.

TABLE 5

| Scheduled bandwidth | Frequency density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Frequency density 2 may correspond to a frequency-domain pattern in which the PT-RS is mapped to one subcarrier every 2 RBs and transmitted, and frequency density 4 may correspond to a frequency-domain pattern in which the PT-RS is mapped to one subcarrier every 4 RBs and transmitted.

In the above configuration, $NRB_0$ and $NRB_1$, which are reference values for a scheduled bandwidth for determining a frequency density, may be defined by higher-layer signaling.

1.6. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include modulation and coding scheme (MCS)/new data indicator (NDI)/redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.8. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3.* $N^{subframe, \mu}_{slot}+1$). In this case, $N^{subframe, \mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold timeDurationForQCL.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
- 'QCL-TypeC' with an SS/PBCH block and, when (QCL-TypeD) is applicable, 'QCL-TypeD' with the same SS/PBCH block, or
- 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or
- 'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with a periodic CSI-RS resource in the higher layer parameter NZP-CSI-RS-ResourceSet configured with the higher layer parameter repetition, or
- 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or
- 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
- 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
- QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

2. Proposed Embodiment

Hereinafter, a configuration proposed in the present disclosure will be described in detail based on the above technical idea and scope.

In the following description, T/F resources may refer to time and/or frequency resources.

In the following description, a case in which T/F resources of respective PDSCHs (e.g., PDSCH #0 and PDSCH #1) transmitted in different transmission and reception points (TRPs) (or beams or panels) overlap is assumed. In this case, the case in which the T/F resources overlap may include all 5 cases illustrated in FIG. 15.

FIG. 15 is a diagram illustrating cases in which two PDSCHs overlap with each other in T/F resources, which are applicable to the present disclosure.

As illustrated in FIG. 15, two PDSCHs may partially overlap (e.g., case #1 to case #3) or may overlap in one of the time domain and the frequency domain (e.g., case #4 and case #5). In cases #1, #2, and #3 of FIG. 15, two PDSCHs (partially) overlap in both time and frequency. In case #4 of FIG. 15, two PDSCHs do not overlap only on the time axis. In case #5 of FIG. 15, two PDSCHs overlap on the time axis, but not on the frequency axis.

In the following description, if time-axis resources of PDSCHs transmitted from different TRPs (or different beams) (partially) overlap with each other (e.g., case #5) or (partially) overlap with each other in time and frequency axes (e.g., case #1, case #2, or case #3), transmission of two PDSCHs will hereinafter be referred to as non-coherent joint transmission (NC-JT).

In the following description, NC-JT based on a single DCI (hereinafter referred to as a single DCI based NC-JT) may indicate that PDSCHs respectively transmitted from the different TRPs (or different beams) are scheduled by only one DCI. For example, the single DCI based NC-JT may include a specific structure obtained when PDSCH #1 and PDSCH #2 for TRPs having different DCI #1 values are simultaneously scheduled.

In the following description, the term "multi DCI based NC-JT" may indicate that PDSCHs respectively transmitted from the different TRPs (or different beams) are scheduled at the respective DCIs. For example, the Multi DCI based NC-JT may include a structure in which DCI #1 and DCI #2 respectively schedule PDSCH #1 and PDSCH #2 at the same time.

In the present disclosure, NC-JT may be classified into two kinds of NC-JTs depending on whether layers transmitted from different TRPs are independent or common.

For example, assuming that the layer is independent, if TRP #A transmits three layers and TRP #B transmits four layers, the UE may expect to use a total of 7 layers. On the other hand, assuming that the layer is common, if TRP #A transmits three layers and TRP #B transmits three layers, the UE may expect to use a total of three layers.

In order to discriminate between the above-mentioned two NC-JTs, the first NC-JT will hereinafter be referred to as "NC-JT with IL (Independent Layer)", and the second NC-JT will hereinafter be referred to as "NC-JT with CL (Common Layer)".

Although technical structures proposed by the present disclosure are basically based on "NC-JT with IL", the scope or spirit of the present disclosure is not limited thereto, and the present disclosure can also extend to "NC-JT with CL".

A method for determining frequency density/position and time density of the phase tracking reference signal (PT-RS) for NC-JT will hereinafter be described in detail.

In the present disclosure, the structure in which the network designed to use two DCIs schedules different PDSCHs for a single UE in time/frequency (T/F) resources that are (partially) overlapped with each other may be similar to a structure in which the single UE is multiplexed to another UE. This is because the PDSCH scheduled by one DCI causes interference to the PDSCH scheduled by another DCI. In addition, a reverse structure of the above-mentioned structure may also be established similarly.

On the other hand, since the phase tracking reference signal (PT-RS) is transmitted for each PDSCH, the operation for enabling one UE to measure a Common Phase Error (CPE) value of the PDSCH associated with the UE can be supported. At this time, if the RE position of the PT-RS defined for one PDSCH overlaps with another PDSCH, the CPE estimation performance based on the PT-RS can be degraded due to interference, resulting in reduction in total throughput.

Therefore, when PDSCH scheduled by one DCI overlaps with the PT-RS for PDSCH scheduled by another DCI, the base station (BS) and the UE can solve the above-mentioned problems by applying rate matching (or puncturing) to the overlapped RE. In other words, the BS and the UE may use the Zero-Power PT-RS (ZP PT-RS) concept, such that the above-mentioned problems can be solved.

In the meantime, the time/frequency (T/F) density of the PT-RS may be determined differently according to the scheduled MCS/BW, and the frequency position of the PT RS may be determined by the DMRS port associated with the PT-RS.

Therefore, in order for the UE to recognize the PT-RS resource position for each PDSCH scheduled by different DCIs and the rate matching (or puncturing) region for each PDSCH scheduled by different DCIs, the UE should successfully decode the different DCIs.

If the UE has missed one DCI and has successfully decoded only the other DCI, the UE may recognize the decoded result as a single PDSCH, such that the UE can receive associated signals without application of the rate matching.

FIG. 16 is a conceptual diagram illustrating two PDSCHs applicable to the present disclosure, and DMRS and PT-RS for each PDSCH applicable to the present disclosure.

In FIG. 16, it is assumed that the two PDSCHs (i.e., PDSCH #0 and PDSCH #1) are scheduled by different DCIs (e.g., DCI #0 and DCI #1). If the UE has successfully decoded two DCIs, the UE may recognize two PT-RS ports #0 and #1, such that the UE can receive associated signals in consideration of the rate matching for specific REs of PDSCH #0 and PDSCH #1 which respectively overlap the PT-RS port #0 and the PT-RS port #1.

In contrast, when the UE has successfully decoded only DCI #0 and has failed to decode DCI #1, the UE may not recognize the presence of PDSCH #1. Meanwhile, in order to protect the PT-RS port #1 (or the PT-RS transmitted through the corresponding port), the BS may not transmit data in the 'Rate match for PT-RS #1' region at PDSCH #0. That is, data can be punctured at the corresponding RE or can be rate-matched at the corresponding RE. However, since the UE does not recognize the presence of PDSCH #1, the UE may not recognize that data is not transmitted in the above-mentioned region, resulting in occurrence of an incorrect UE behavior.

Accordingly, in the multi-DCI based NC-JT, the present disclosure provides a method for minimizing (or reducing) the above-mentioned problems even when the UE has unavoidably missed any one of some DCIs, and a detailed description thereof will hereinafter be given.

In the following description, NC-JT may refer to "NC-JT with IL. However, the scope or spirit of the present disclosure is not limited thereto, and the present disclosure can also extend to "NC-JT with CL", "C-JT with IL (Coherent Joint Transmission)", and "C-JT with CL".

In the present disclosure, the BS may configure the NC-JT for the UE as follows. However, the following configuration method is merely an example, and the above-mentioned configuration method can also be implemented by other methods other than the proposed method of the present disclosure. In this case, the following characteristics of the present disclosure can be applied to the embodiments,

- A plurality of RS sets may be defined in one TCI state. As a result, the BS may inform the UE of "single/multi-DCI based NC-JT" information.
- One RS set may be defined in one TCI state. The BS may inform the UE of the TCI states through only one DCI. As a result, the BS may inform the UE of "single/multi-DCI based NC-JT" information.
- NC-JT purposed RNTI (Random Network Temporary Identifier) may be defined differently from C-RNTI (Cell Random Network Temporary Identifier). If the UE successfully decodes DCI using the NC-JT purposed RNTI, the UE can recognize that NC-JT has been indicated.

In the present disclosure, a plurality of DCIs paired with NC-JT may refer to an exemplary case in which PDSCHs scheduled by the DCIs are (partially) overlapped in T/F resources.

In the present disclosure, in order to protect the PT-RS, the BS may not transmit data in some REs from among the PDSCH. To this end, the BS may perform puncturing on data of some REs, or may perform rate matching on data of some REs. In accordance with the embodiments, the some RE regions may be defined as ZP PT-RS (Zero-Power PT-RS).

2.1. First Method

If the UE directly or indirectly recognizes the Multi DCI based NC-JT, the UE may expect or recognize that the time density of the PT-RS is equal to a default time density (e.g., a time density=2 or 1).

In more detail, when PDSCHs scheduled by different DCIs are partially overlapped with each other in time/frequency resources, the BS may not determine the time density of the PT-RS corresponding to each PDSCH on the basis of the MCS, and may determine the time density of the PT-RS to be a default time density.

As shown in the above-mentioned Table 4, the time density of the PT-RS may be determined based on the scheduled MCS. Meanwhile, the time density of the PT-RS may be a single DCI based NC-JT. If MCSs of two different PDSCHs are different from each other, the time density of the PT-RS corresponding to each PDSCH may be determined based on a higher MCS from among two PDSCHs.

However, when the multi-DCI based scheduling is performed and the UE has missed any one of the DCIs, it is impossible for the UE to recognize the MCS indicated by the missed DCI. As a result, the UE may not recognize time densities of PDSCH and PT-RS that are scheduled by the missed DCI.

In order to address the above-mentioned issues, if the UE directly or indirectly recognizes the multi DCI based NC-JT, the UE may assume (or recognize) that the time density of the PT-RS is equal to a default time density. In other words, if the UE directly or indirectly recognizes the multi DCI based NC-JT, the time density of the PT-RS corresponding to each PDSCH may not be determined based on the corresponding MCS.

2.2. Second Method

If the UE directly or indirectly recognizes the Multi DCI based NC-JT, the UE may expect or recognize that the time density of the PT-RS is equal to a default time density (e.g., a frequency density=2).

In more detail, when PDSCHs scheduled by different DCIs are partially overlapped with each other in time/frequency resources, the BS may not determine the time density of the PT-RS corresponding to each PDSCH on the basis of the BW allocated to the UE, and may determine the time density of the PT-RS to be a default time pattern.

As shown in the above-mentioned Table 5, the frequency density of the PT-RS may be determined based on the scheduled BW size.

On the other hand, in the case of "Single DCI with NC-JT", the frequency density of the PT-RS may be determined differently depending on whether frequency allocation information for two PDSCHs belonging to one DCI is indicated commonly or separately. For example, if the frequency allocation information for two PDSCHs contained in one DCI is commonly indicated, BWs of two PDSCHs completely overlap each other, such that no problems occur. In contrast, if the frequency allocation information for two PDSCHs contained in one DCI is indicated separately (e.g., if PDSCHs transmitted from different TRPs are transmitted through different frequency resources), PT-RS values corresponding to the respective PDSCHs may have different frequency densities.

In contrast, in the case of "Multi-DCI", different BW sizes can be allocated to the respective DCIs, such that the PT-RS corresponding to the respective PDSCHs may have different frequency densities. In this case, if the UE has missed one DCI, the UE may not recognize the allocated BW size of a PDSCH scheduled by the missed DCI.

In order to address the above-mentioned issues, if the UE directly or indirectly recognizes the Multi DCI based NC-JT, the UE may assume (or recognize) that the frequency density of the PT-RS is equal to a default frequency density regardless of the allocated BW size. In other words, if the multi DCI based NC-JT for the UE is directly or indirectly indicated, the frequency density of the PT-RS corresponding to each PDSCH may not be determined based on the corresponding BW.

2.3. Third Method

If the UE directly or indirectly recognizes the Multi DCI based NC-JT, the UE may expect (or recognize) that the PT-RS will be sequentially transmitted from the RB having the lowest index from among RBs, irrespective of the BW and RNTI that are allocated to the UE.

In more detail, when PDSCHs scheduled by different DCIs (partially) overlap each other in time/frequency resources, the PT-RS can be sequentially transmitted from the RB having the lowest index from among RBs, irrespective of the BW and RNTI that are associated with each DCI.

According to Rel-15 NR TS 36.211, subcarrier indexes mapped to the PT-RS can be determined as follows. In this case, the lowest RB index mapped to the PT-RS may be calculated using a modulo operation in which C-RNTI (Cell RNTI) or CS-RNTI (Configured Scheduling RNTI) is used as a frequency density.

TABLE 6

$$k = k_{ref}^{RE} + (iK_{PT\text{-}RS} + k_{ref}^{RB}) N_{sc}^{RB}$$

$$k_{ref}^{RB} = \begin{cases} n_{RNTI} \bmod K_{PT\text{-}RS} & \text{if } N_{RB} \bmod K_{PT\text{-}RS} = 0 \\ n_{RNTI} \bmod (N_{RB} \bmod K_{PT\text{-}RS}) & \text{otherwise} \end{cases}$$

If the frequency density is set to 2 and the allocated RB size is denoted by an odd number, the PT-RS can be sequentially transmitted from the RB having the lowest index from among RBs, irrespective of RNTI.

In this case, assuming that the BW sizes of two PDSCHs scheduled by different DCIs are respectively denoted by an even number {even} and an odd number {odd}, the following problems may occur. For example, if "C-RNTI=odd" and "frequency density=2" are given and the BW size for the first PDSCH is denoted by an even number, definition of the PT-RS for the first PDSCH may be sequentially started from the RB having the lowest RB index+1 from among the allocated RBs. In contrast, if the BW size of the second PDSCH scheduled by the other DCI is denoted by an odd number {odd}, definition of the PT-RS for the second PDSCH may be sequentially started from the RB having the lowest index from among the allocated RBs.

In this case, the RB positions in which two PT-RSs are defined may be different from each other. In order to address the above-mentioned issues, if the UE directly or indirectly recognizes the Multi DCI based NC-J, the UE may expect (or recognize) that the PT-RS will be sequentially transmitted from the RB having the lowest RB from among RBs, regardless of the BW and RNTI allocated to the UE. As a result, in the case of Multi DCI based NC-JT, the BS can sequentially transmit the PT-RS in the range from the RB having the lowest RB from among RBs, regardless of the BW and RNTI.

2.4. Fourth Method

If the UE directly or indirectly recognizes the Multi DCI based NC-JT, and if the DMRS port having the lowest index from among DMRS ports indicated by one DCI is denoted by #1000 (or #1002), the UE can expect that the DMRS port having the lowest index from among DMRS ports indicated by another DCI is denoted by #1002 (or #1000). In addition, if the DMRS port having the lowest index from among DMRS ports indicated by one DCI is denoted by #1001 (or #1003), the UE can expect that the DMRS port having the lowest index from among DMRS ports indicated by another DCI is denoted by #1003 (or #1001).

In more detail, when PDSCHs scheduled by different DCIs (partially) overlap each other in time/frequency resources, the BS may recognize a DMRS port index allocated by one DCI from among the different DCIs, such that the BS may determine the DMRS port index allocated by the other DCI from among the different DCIs based on the recognized DMRS port index. For example, when DMRS port #1000 is allocated by the one DCI, DMRS port #1004 may be allocated by the other DCI. In addition, a reverse structure of the above-mentioned structure can also be established. Similarly, when PDSCHs scheduled by different DCIs (partially) overlap each other in time/frequency resources, the BS may determine the DMRS port index allocated by the other DCI from among the different DCIs based on the DMRS port index allocated by one DCI from among the different DCIs. For example, when the DMRS port #1001 is allocated by the one DCI, the DMRS port #1003 may be allocated by the other DCI. In addition, a reverse structure of the above-mentioned structure can also be established. As a result, the UE may assume (or determine) the DMRS port index allocated by the other DCI based on the DMRS port index allocated by one DCI from among the different DCIs.

According to legacy Rel-15 NR specifications, the PT-RS may be defined on one subcarrier from among the plurality of subcarriers to which the associated DMRS port is allocated. In this case, the QCL relationship can be implemented between the DMRS ports associated with the PT-RS port.

TABLE 7

The DL DM-RS port(s) associated with PT-RS port are assumed to be quasi co-located with respect to {QCL-TypeA' and QCL-TypeD'}. If a UE is scheduled with one codeword, the PT-RS antenna port is associated with the lowest indexed DM-RS antenna port among the DM-RS antenna ports assigned for the PDSCH.

For example, if the first DCI indicates DMRS ports #1000 and #1001 and the second DCI indicates DMRS port #1002, the first PT-RS may be associated with DMRS port #1000, and the second PT-RS may be associated with DMRS port #1002. Accordingly, the first PT-RS may be defined on the same subcarrier as DMRS port #1000, and the second PT-RS may be defined on the same subcarrier as DMRS port #1002.

On the other hand, if the UE has missed the second DCI, the UE may not recognize the DMRS port indicated by the second DCI. In this case, since the first DCI indicates DMRS ports #1000 and #1001, the UE should consider all cases in which the second DCI indicates DMRS port #1002, DMRS port #1003, or DMRS ports #1002 and #1003. Therefore, the UE may assume that the PT-RS is transmitted on the subcarriers associated with DMRS ports #1002 and #1003, such that it can be assumed that rate matching (or puncturing) is applied to the corresponding subcarriers. However, throughput loss may unexpectedly occur.

In order to address the above-mentioned issues, the BS may set (or limit) the smallest DMRS port index from among DMRS port(s) indexes indicated by the second DCI to DMRS port #1002.

In this case, the UE need not expect that DMRS port #1003 is associated with the PT-RS. In addition, the PT-RS corresponding to DMRS port #1003 is not defined, such that the BS may transmit data on the subcarrier for the PT-RS corresponding to DMRS port #1003. Thus, according to the method proposed by the present disclosure, unnecessary throughput loss may not occur.

FIG. 17 is a diagram illustrating operations of the UE and the BS applicable to the present disclosure, FIG. 18 is a flowchart illustrating the operation of the UE according to the present disclosure, and FIG. 19 is a flowchart illustrating the operation of the BS according to the present disclosure.

The UE may receive downlink (DL) control information (DCI) configured to schedule a first physical downlink shared channel (PDSCH) from the BS (or network) (S1710, S1810). In this case, the BS (or network) may include a plurality of TRPs. Thus, the BS (or network) may transmit, to the UE, DCI configured to schedule the first PDSCH (S1710, S1910).

Subsequently, the UE may acquire information indicating that the first PDSCH and the second PDSCH overlapping the first PDSCH are transmitted to the UE (S1720, S1820). In this case, the UE may acquire the above-mentioned information based on at least one of the following methods.

For example, the UE may acquire the above-mentioned information based on specific information indicating that the received DCI is associated with the plurality of TCI (Transmission Configuration Indicator) states. In this case, the one TCI state may be associated with one RS set.

In another example, the UE may acquire the above-mentioned information based on an RNTI (random network temporary identifier) applied to the received DCI.

The BS (or network) may transmit the first PDSCH, the second PDSCH, and the PT-RS for the second PDSCH (associated with the second PDSCH) to the UE (S1730, S1920). In this case, the first PDSCH may be transmitted through the same or different TRPs as in the second PDSCH and the PT-RS.

Subsequently, the UE may receive a downlink (DL) signal including the first PDSCH from the BS (or network) (S1730, S1830). For example, if the UE receives the above DCI and an additional DCI scheduling the second PDSCH, the UE may receive the first PDSCH, the second PDSCH, and the PT-RS. In contrast, if the UE does not receive the additional DCI scheduling the second PDSCH, the UE does not recognize scheduling information of the second PDSCH, such that the UE can receive only the first PDSCH.

For both of the above two cases, upon receiving specific information indicating that the first PDSCH overlaps with the second PDSCH, the UE may receive the first PDSCH on the assumption that data is not transmitted through resources in which a resource allocated for the first PDSCH overlaps with the PT-RS for the second PDSCH (S1740, S1840). In other words, the UE may receive the first PDSCH on the above assumption, and may acquire associated data.

In the present disclosure, the first PDSCH and the second PDSCH may partially overlap each other in time and frequency domains.

In addition, the operation for allowing the UE to receive the first PDSCH may include receiving, by the UE, the first PDSCH on the assumption that the first PDSCH is punctured or rate-matched in some resources in which a resource allocated for the first PDSCH overlaps with the PT-RS.

In the present disclosure, it is assumed that the time density of the PT-RS is a default time density but not an MCS (modulation and coding scheme) scheduled for the UE. For example, the default time density may be preset to 1 or 2.

In the present disclosure, it can be assumed that the frequency density of the PT-RS is a default frequency density but not a bandwidth (BW) size scheduled for the UE. For example, the default frequency density may be preset to 2.

In the present disclosure, when the PT-RS for the first PDSCH is associated with the DMRS port index X, it is assumed that the PT-RS is associated with the DMRS port index Y matched to the DMRS port index X. In this case, X or Y is a natural number. For example, if the DMRS configuration type 1 is configured for the first PDSCH, an {X, Y} combination may be set to any one of {#1000, #1002}, {#1001, #1003}, {#1002, #1000}, and {#1003, #1001}.

Since examples of the above-described proposal method may also be included in one of implementation methods of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the base station informs the UE of information as to whether the proposed methods are applied (or information about rules of the proposed methods) through a predefined signal (e.g., a physical layer signal or a higher-layer signal).

3. Device Configuration

FIG. 20 is a diagram illustrating configurations of a UE and a BS by which proposed embodiments can be implemented. The UE and the BS illustrated in FIG. 20 operate to implement the embodiments of the above-described DL signal transmission and reception method between the UE and the BS.

The UE 1001 may operate as a transmission end on UL and as a reception end on DL. The BS (eNB or gNB) 1100 may operate as a reception end on UL and as a transmission end on DL That is, the UE and the BS may include transmitters 1010 and 1110 and receivers 1020 and 1120, respectively, to control transmission and reception of information, data and/or messages and may include antennas 1030 and 1130, respectively, to transmit and receive information, data, and/or messages.

The UE and the BS further include processors 1040 and 1140, respectively, for performing the above-described embodiments of the present disclosure. The processors 1040 and 1140 control memories 1050 and 1150, the transmitters 1010 and 1110, and/or the receivers 1020 and 1120, respectively, to implement the above-described/proposed procedures and/or methods.

For example, the processors 1040 and 1140 include communication modems designed to implement radio communication technology (e.g., LTE or NR). The memories 1050 and 1150 are connected to the processors 1040 and 1140 and store various information related to operations of the processors 1040 and 1140. As an example, the memories 1050 and 1150 may perform a part or all of processes controlled by the processors 1040 and 1140 or store software code including the above-described/proposed procedures and/or methods. The transmitters 1010 and 1110 and/or the receivers 1020 and 1120 are connected to the processors 1040 and 1140 and transmit and/or receive radio signals. The processors 1040 and 1140 and the memories 1050 and 1150 may be a part of a processing chip (e.g., system-on-chip (SoC)).

The transmitters and receivers included in the UE and the BS may perform a packet modulation and demodulation function, a high-speed packet channel coding function, an OFDMA packet scheduling function, and/or a channelization function, for data transmission. The UE and the BS of FIG. 20 may further include low-power radio frequency (RF)/intermediate frequency (IF) units.

FIG. 21 is a block diagram of a communication device for implementing proposed embodiments.

The device illustrated in FIG. 21 may be a UE and/or a BS (e.g., an eNB or a gNB) adapted to perform the above mechanism or may be any device for performing the same operation.

As illustrated in FIG. 21, the device may include a digital signal processor (DSP)/microprocessor 2210 and an RF module (transceiver) 2235. The DSP/microprocessor 2210 is electrically connected to the transceiver 2235 to control the transceiver 2235. The device may further include a power management module 2205, a battery 2255, a display 2215, a keypad 2220, a SIM card 2225, a memory device 2230, a speaker 2245, and an input device 2250, according to the selection of a designer.

Specifically, FIG. 21 illustrates a UE including the receiver 2235 configured to receive a request message from a network and the transmitter 2235 configured to transmit transmission or reception timing information to the network. The receiver and the transmitter may constitute the transceiver 2235. The UE may further include the processor 2210 connected to the transceiver 2235 (receiver and transmitter).

In addition, FIG. 21 illustrates a network device including the transmitter 2235 configured to transmit a request message to the UE and the receiver 2235 configured to receive transmission or reception timing information from the UE. These transmitter and receiver may constitute the transceiver 2235. The network further includes the processor 2210 connected to the transmitter and the receiver. This processor 2210 may be configured to calculate latency based on the transmission or reception timing information.

Thus, the processor included in the UE (or a communication device included in the UE) according to the present disclosure and the processor included in the BS (or a communication device included in the BS) according to the present disclosure may control the corresponding memories and operate as follows.

In the present disclosure, the UE may include at least one radio frequency (RF) module; at least one processor; and at least one memory operably connected to the at least one processor, for storing instructions for causing the at least one processor to perform a specific operation when the at least one processor is executed. In this case, the communication device included in the UE may be configured to include the at least one processor and the at least one memory. The communication device may be configured to include that at least one RF module or may be configured to be connected to at least one RF module without including the at least one RF module.

At least one processor (or at least one processor of the communication device included in the UE) included in the UE may control the at least one RF module to receive DCI configured to schedule the first PDSCH, and to acquire information indicating that the first PDSCH and the second PDSCH overlapping the first PDSCH are transmitted to the UE. Moreover, based on the above-mentioned information, assuming that data is not transmitted through resources in which a resource allocated for the first PDSCH overlaps with the PT-RS for the second PDSCH, the at least one processor included in the UE may control the at least one RF module to receive the first PDSCH.

The UE (or the communication device included in the UE) may be configured to communicate with at least one of a mobile terminal, a network, or a self-driving vehicle other than a vehicle in which the UE is included.

In the present disclosure, the BS may include at least one radio frequency (RF) module; at least one processor; and at least one memory operably connected to the at least one processor, for storing instructions for causing the at least one processor to perform a specific operation when the at least one processor is executed. In this case, the communication device included in the BS may be configured to include the at least one processor and the at least one memory. The communication device may be configured to include that at least one RF module or may be configured to be connected to at least one RF module without including the at least one RF module.

At least one processor (or at least one processor of the communication device included in the BS) included in the BS may control the at least one RF module to transmit DCI configured to schedule the first PDSCH, and to transmit, to the UE, the first PDSCH, the second PDSCH overlapping the first PDSCH, and the PT-RS for the second PDSCH. In this case, data may not be transmitted on resources in which the first PDSCH and the PT-RS overlap each other.

The UE in the present disclosure may use a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smartphone, or a multi-mode multi-band (MM-MB) terminal.

In this case, the smartphone refers to a terminal taking the advantages of both a mobile communication terminal and a PDA and may be a terminal which incorporates functions of the PDA, i.e., a scheduling function and a data communication function such as fax transmission and reception and Internet connection, into the mobile communication terminal. The MM-MB terminal refers to a terminal which has a multi-modem chip therein and which can operate in any of a mobile Internet system and other mobile communication systems (e.g. a code division multiple access (CDMA) 2000 system, a WCDMA system, etc.).

Embodiments of the present disclosure may be implemented by various means, for example, hardware, firmware, software, or a combination thereof.

In a hardware implementation, methods according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software implementation, the methods according to the embodiments of the present disclosure may be implemented in the form of a module, a procedure, a function, etc. for performing the above-described functions or operations. For example, software code may be stored in the memory 1050 or 1150 and executed by the processor 1040 or 1140. The memory is located at the interior or exterior of the processor and may transmit and receive data to and from the processor via various known means.

The above-described communication device may be a BS, a network node, a transmission terminal, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, or the like.

For example, the UE may include a cellular phone, a smartphone, a laptop computer, a digital broadcast terminal, a PDA, a portable multimedia player (PMP), a navigation device, a slate PC, a tablet PC, an ultrabook, or a wearable device (e.g., a smart watch, smart glasses, or a head mounted display (HMD)). For example, the UAV may be an unmanned aircraft flying according to a wireless control signal. For example, the HMD is a display device wearable on the head, which may be used to implement VR or AR.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

Additionally, the embodiments of the present disclosure are applicable to various applications such as a self-driving vehicle, a UAV, etc.

The invention claimed is:

1. A method for receiving a downlink signal by a user equipment (UE) in a wireless communication system, the method comprising:
   receiving downlink control information (DCI) scheduling a first physical downlink shared channel (PDSCH);
   obtaining, based on a random network temporary identifier (RNTI) applied to the DCI, information on that the first PDSCH and a second PDSCH overlapping the first PDSCH are transmitted to the UE; and
   receiving the first PDSCH on an assumption that data is not transmitted through resources in which a resource allocated for the first PDSCH overlaps with a phase tracking reference signal (PT-RS) for the second PDSCH, based on the information.

2. The method according to claim 1, wherein:
   the information is obtained based on the DCI being associated with a plurality of transmission configuration indicator (TCI) states,
   wherein one TCI state from among the plurality of TCI states is associated with one reference signal (RS) set.

3. The method according to claim 1, wherein:
   the first PDSCH and the second PDSCH partially overlap each other in time and frequency domains.

4. The method according to claim 1, wherein the receiving the first PDSCH includes:
   receiving the first PDSCH on an assumption that the first PDSCH is punctured or rate-matched in some resources in which a resource allocated for the first PDSCH overlaps with the PT-RS.

5. The method according to claim 1, wherein:
   a time density of the PT-RS is assumed to be a default time density but not a modulation and coding scheme (MCS) scheduled for the UE.

6. The method according to claim 5, wherein:
   the default time density is preset to 1 or 2.

7. The method according to claim 1, wherein:
   a frequency density of the PT-RS is assumed to be a default frequency density but not a bandwidth (BW) size scheduled for the UE.

8. The method according to claim 7, wherein:
   the default frequency density is preset to 2.

9. The method according to claim 1, wherein:
   if a PT-RS for the first PDSCH is associated with a demodulation reference signal (DMRS) port index X, it is assumed that the PT-RS is associated with a DMRS port index Y matched to the DMRS port index X,
   wherein X or Y is a natural number.

10. The method according to claim 9, wherein:
    if a DMRS configuration type 1 is configured for the first PDSCH, an {X, Y} combination is set to any one of {#1000, #1002}, {#1001, #1003}, {#1002, #1000}, and {#1003, #1001}.

11. A user equipment (UE) configured to receive a downlink signal in a wireless communication system, the UE comprising:
    at least radio frequency (RF) module;
    at least one processor; and
    at least one memory operatively connected to the at least one processor, and configured to store instructions such that the at least one processor performs specific operations by executing the instructions,
    wherein the specific operations include:
    controlling the at least one RF module to receive downlink control information (DCI) scheduling a first physical downlink shared channel (PDSCH);
    obtaining, based on a random network temporary identifier (RNTI) applied to the DCI, information on that the first PDSCH and a second PDSCH overlapping the first PDSCH are transmitted to the UE; and
    controlling the at least one RF module to receive the first PDSCH on an assumption that data is not transmitted through resources in which a resource allocated for the first PDSCH overlaps with a phase tracking reference signal (PT-RS) for the second PDSCH, based on the information.

12. The UE according to claim 11, wherein:
    the UE is configured to communicate with at least one of a mobile terminal, a network, or an autonomous vehicle other than a vehicle including the UE.

13. A base station (BS) configured to transmit a downlink signal in a wireless communication system, the BS comprising:
    at least radio frequency (RF) module;
    at least one processor; and
    at least one memory operatively connected to the at least one processor, and configured to store instructions such that the at least one processor performs specific operations by executing the instructions,
    wherein the specific operations include:
    controlling the at least one RF module to transmit downlink control information (DCI) scheduling a first physical downlink shared channel (PDSCH) to a user equipment (UE), wherein a random network temporary identifier (RNTI) is applied to the DCI for the UE to obtain information on that the first PDSCH and a second PDSCH overlapping the first PDSCH are transmitted to the UE; and
    transmitting the first PDSCH, the second PDSCH, and a phase tracking reference signal (PT-RS) for the second PDSCH to the UE,
    wherein data is not transmitted in resources in which the first PDSCH overlaps with the PT-RS based on the information.

* * * * *